(12) United States Patent
Hendry et al.

(10) Patent No.: US 10,419,768 B2
(45) Date of Patent: Sep. 17, 2019

(54) TILE GROUPING IN HEVC AND L-HEVC FILE FORMATS

(71) Applicant: QUALCOMM Incorporated, San Diego, CA (US)

(72) Inventors: Fnu Hendry, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 15/470,148

(22) Filed: Mar. 27, 2017

(65) Prior Publication Data

US 2017/0289556 A1 Oct. 5, 2017

Related U.S. Application Data

(60) Provisional application No. 62/315,575, filed on Mar. 30, 2016.

(51) Int. Cl.
| | |
|---|---|
| H04N 19/169 | (2014.01) |
| H04N 19/119 | (2014.01) |
| H04N 19/70 | (2014.01) |
| H04N 19/30 | (2014.01) |
| H04N 21/854 | (2011.01) |

(52) U.S. Cl.
CPC ......... *H04N 19/188* (2014.11); *H04N 19/119* (2014.11); *H04N 19/30* (2014.11); *H04N 19/70* (2014.11); *H04N 21/85406* (2013.01)

(58) Field of Classification Search
CPC .... H04N 19/119; H04N 19/188; H04N 19/30; H04N 19/70; H04N 21/85406
See application file for complete search history.

(56) References Cited

U.S. PATENT DOCUMENTS

2014/0003491 A1* 1/2014 Chen .................... H04N 19/597
375/240.02
2014/0301464 A1 10/2014 Wu et al.

OTHER PUBLICATIONS

"Draft DoC on ISO/IEC DIS 14496-15 4th edition", 114, MPEG Meeting; Feb. 22, 2016-Feb. 26, 2016; San Diego; (Motion Picture Expert Group or ISO/IEC JTC1/SC29/WG11 ), No. N15927, Mar. 2, 2016, XP030022601, 42 pages.

(Continued)

*Primary Examiner* — Farzana Hossain
(74) *Attorney, Agent, or Firm* — Shumaker & Sieffert, P.A.

(57) ABSTRACT

A device generates a Network Abstraction Layer (NAL) Unit Map Entry box in a file. The NAL Unit Map Entry box associates NAL units with a tile set that includes two or more tiles of a plurality of tiles into which a current picture is partitioned. A region of the current picture covered by the tile set may be non-rectangular. Additionally, the device generates a tile set group entry in the file. The tile set group entry includes a horizontal offset, a vertical offset, a width, and a height. The horizontal offset specifies a horizontal offset of a top-left pixel of a minimum rectangular region that covers tiles in the tile set. The vertical offset specifies a vertical offset of the top-left pixel of the minimum rectangular region. The width specifies a width of the minimum rectangular region. The height specifies a height of the minimum rectangular region.

30 Claims, 12 Drawing Sheets

(56) References Cited

OTHER PUBLICATIONS

Hendry et al., "Comments on storage of tiled video in ISO/IEC 14496-15", 115, MPEG Meeting; May 30, 2016-Jun. 3, 2016; Geneva, (Motion Picture Expert Group or ISO/IEC JTC1/SC29/WG11), No. M38225r3, May 27, 2016, 7 pages, XP030066581.
Response to Written Opinion dated Jun. 12, 2017 from International Application No. PCT/US2017/024560, filed on Sep. 11, 2017, 28 pp.
Second Written Opinion from International Application No. PCT/US2017/024560, dated Feb. 13, 2018, 4 pp.
International Preliminary Report on Patentability from International Application No. PCT/US2017/024560, dated May 11, 2018, 25 pp.
Richardson, "Chapter 6: H.264/MPEG4 Part 10," H.264 and MPEG-4 Video Compression, Oct. 17, 2003, pp. 159-223.
ITU-T H.263, Series H: Audiovisual and Multimedia Systems, Infrastructure of audiovisual services—Coding of moving video, Video coding for low bit rate communication, The International Telecommunication Union. Jan. 2005, 226 pp.
International Search Report and Written Opinion of International Application No. PCT/US2017/024560 dated Jun. 12, 2017, 17 PP.
"Study of ISO/IEC DIS 14496-15 4th Edition", 113, MPEG Meeting, Oct. 19-23, 2015; Geneva; (Motion Picture Expert Group or ISO/IEC JTC1/SC29/WG11), No. N15640, Dec. 7, 2015, XP030022328, 172 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
CCITT H.261, Line Transmission on Non-Telephone Signals, Video Codec for Audiovisual Services at p x 64 kbit/s, The International Telecommunication Union. Jan. 1990, 32 pp.
ITU-T H.262, Series H: Transmission of Non-Telephone Signals—Information Technology—Generic Coding of Moving Pictures and Associated Audio Information: Video, The International Telecommunication Union. Jul. 1995, 211 pp.
"International Standard ISO/IEC 14496-14, Information Technology—Coding of audio-visual objects—Part 14: MP4 file format," First Edition, Nov. 15, 2003, 18 pp.
Tech, et al., "MV-HEVC Draft Text 3 (ISO/IEC 23008-2:201x/PDAM2)," JCT-3V Meeting; Jan. 17-23, 2013; (Joint Collaborative Team on Video Coding of ISO/IEC JTC1/SC29/WG11 and ITU-T SG.16); document No. JCT3V-C1004_d3, Mar. 27, 2013; 34 pp.

* cited by examiner

MINIMUM RECTANGULAR AREA THAT COVERS TILES IN THE TILE SET

ONE TILE IN THE TILE SET

TILE GROUPING IN HEVC AND L-HEVC FILE FORMATS

This application claims the benefit of U.S. Provisional Patent Application 62/315,575, filed Mar. 30, 2016, the entire content of which is incorporated by reference.

TECHNICAL FIELD

This disclosure relates to video coding and file formats for coded video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

One or more aspects of this disclosure relate to storage of video contents in file formats. For instance, the techniques of this disclosure may improve handling of grouping of tiles in the HEVC and layered HEVC (L-HEVC, also simplified as LHEVC) file formats.

In one example, this disclosure describes a method for storage of video data, the method comprising: receiving, by a file generation device, a bitstream that includes a sequence of bits that forms a representation of encoded pictures of the video data, the pictures of the video data including a current picture, the current picture being partitioned into a plurality of tiles, each respective tile of the plurality of tiles being a respective rectangular region; generating, by the file generation device, a Network Abstraction Layer (NAL) Unit Map Entry box in a file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and generating, by the file generation device, a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set.

In another example, this disclosure describes a method of processing a file storing encoded video data, the method comprising: obtaining, by a file processing device, a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape; obtaining, by the file processing device, a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set; and processing the tile set based on the horizontal offset syntax element, the vertical offset syntax element, the width syntax element, and the height syntax element.

In another example, this disclosure describes a device for generating a file for storing video data, the device comprising: a memory configured to store a file for storage of video contents; and one or more processors configured to: receive a bitstream that includes a sequence of bits that forms a representation of encoded pictures of the video data, the pictures of the video data including a current picture, the current picture being partitioned into a plurality of tiles, each respective tile of the plurality of tiles being a respective rectangular region; generate a Network Abstraction Layer (NAL) Unit Map Entry box in the file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and generate a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set.

In another example, this disclosure describes a device for processing a file storing encoded video data, the device comprising: a memory configured to store a file for storage of video contents; and one or more processors configured to: obtain a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape; obtain a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set; and process the tile set based on the horizontal offset syntax element, the vertical offset syntax element, the width syntax element, and the height syntax element.

In another example, this disclosure describes a device for generating a file for storage video data, the device comprising: means for receiving a bitstream that includes a sequence of bits that forms a representation of encoded pictures of the video data, the pictures of the video data including a current picture, the current picture being partitioned into a plurality of tiles, each respective tile of the plurality of tiles being a respective rectangular region; means for generating a Network Abstraction Layer (NAL) Unit Map Entry box in a file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and means for generating a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set.

In another example, this disclosure describes a device for processing a file storing encoded video data, the device comprising: means for obtaining a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape; means for obtaining a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set; and means for processing the tile set based on the horizontal offset syntax element, the vertical offset syntax element, the width syntax element, and the height syntax element.

In another example, this disclosure describes a computer-readable data storage medium having instructions stored thereon that, when executed, configure a device to: receive a bitstream that includes a sequence of bits that forms a representation of encoded pictures of the video data, the pictures of the video data including a current picture, the current picture being partitioned into a plurality of tiles, each respective tile of the plurality of tiles being a respective rectangular region; generate a Network Abstraction Layer (NAL) Unit Map Entry box in a file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and generate a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set.

In another example, this disclosure describes a computer-readable data storage medium having instructions stored thereon that, when executed, configure a device to: obtain, by a file processing device, a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape; obtain, by the file processing device, a tile set group entry in the file, the tile set group entry including a group identifier syntax element that identifies the tile set, the tile set group entry including a horizontal offset syntax element, a vertical offset syntax element, a width syntax element, and a height syntax element, the horizontal offset syntax element specifying a horizontal offset of a top-left pixel of a minimum rectangular region that covers tiles in the tile set, the vertical offset syntax element specifying a vertical offset of the top-left pixel of the minimum rectangular region that covers tiles in the tile set, the width syntax element specifying a width of the minimum rectangular region that covers the tiles in the tile set, and the height syntax element specifying a height of the minimum rectangular region that covers the tiles in the tile set; and process the tile set based on the horizontal offset syntax element, the vertical offset syntax element, the width syntax element, and the height syntax element.

The details of one or more examples of the disclosure are set forth in the accompanying drawings and the description below. Other features, objects, and advantages will be apparent from the description, drawings, and claims.

DETAILED DESCRIPTION

The International Standards Organization (ISO) base media file format (ISOBMFF) and file formats derived from the ISO base media file format are designed for storage of video contents. ISOBMFF has been extended to work with various video encoding standards, such as H.265, High Efficiency Video Coding (HEVC), H.264/AVC, and other video encoding standards.

Pictures may be partitioned into rectangular regions called "tiles." In some circumstances, it may be desirable to only read out Network Abstract Layer (NAL) units of particular tiles of a series of pictures. For instance, it may be desirable to transmit NAL units that include encoded blocks of the top halves of pictures without transmitting NAL units that include encoded blocks of the bottom halves of pictures. However, the mechanisms in the extensions to the ISOBMFF format have several problems that may reduce the efficiency of accessing, from a file, information specific to tiles and sets of tiles. The techniques of this disclosure may improve the efficiency of accessing such information.

For example, a file generation device may receive a bitstream that includes a sequence of bits that forms a representation of encoded pictures of video data. In this example, the pictures of the video data include a current picture, the current picture is partitioned into a plurality of tiles, and each respective tile of the plurality of tiles is a respective rectangular region. Furthermore, in this example, the file generation device may generate a NAL Unit Map Entry box in a file. The NAL Unit Map Entry box may associate NAL units of the bitstream with a tile set. The tile set includes two or more tiles of the plurality of tiles into which the current picture is partitioned. Furthermore, in some instances, a region of the current picture covered by the tiles in the tile set is not rectangular in shape. Additionally, in this example, the file generation device may generate a tile set group entry in the file. In this example, the tile set group entry includes a group identifier syntax element that identifies the tile set. The tile set group entry may include a horizontal offset syntax element, a vertical offset syntax element, a width syntax element, and a height syntax element. The horizontal offset syntax element specifies a horizontal offset of a top-left pixel of a minimum rectangular region that covers tiles in the tile set. The vertical offset syntax element specifies a vertical offset of the top-left pixel of the minimum rectangular region that covers tiles in the tile set. The width syntax element specifies a width of the minimum rectangular region that covers the tiles in the tile set. The height syntax element specifies a height of the minimum rectangular region that covers the tiles in the tile set.

Figure 1:
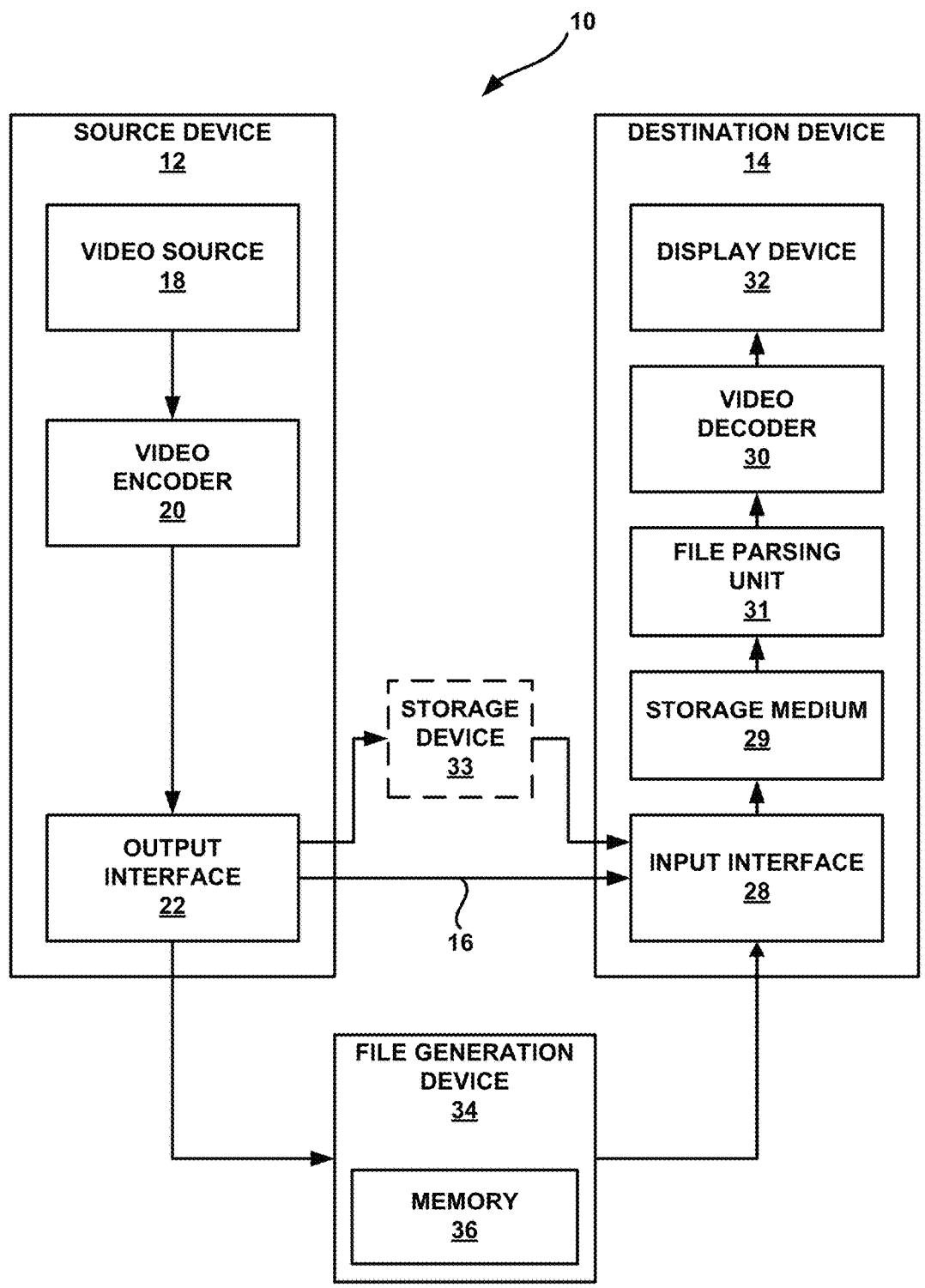
FIG. 1 is a block diagram illustrating an example video encoding and decoding system that may use the techniques described in this disclosure.

FIG. 1 is a block diagram illustrating an example video encoding and decoding system 10 that may use the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. Hence, source device 12 and destination device 14 may be considered wireless communication devices. Source device 12 and destination device 14 may be considered video devices.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications.

Video encoder 20 may encode the captured, pre-captured, or computer-generated video. Source device 12 may transmit the encoded video data directly to destination device 14 via output interface 22 of source device 12. The encoded video data may also (or alternatively) be stored onto storage device 33 for later access by destination device 14 or other devices, for decoding and/or playback.

Destination device 14 includes an input interface 28, a video decoder 30, and a display device 32. Furthermore, in the example of FIG. 1, destination device 14 includes a storage medium 29 and a file parsing unit 31. In some cases, input interface 28 may include a receiver and/or a modem. Input interface 28 of destination device 14 may receive the encoded video data over a link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

File parsing unit 31 may obtain a file and process the file in various ways. For example, file parsing unit 31 may parse the file to obtain information from the file. Hence, a device that implements file parsing unit 31 may be referred to as a file processing device. Although shown as part of destination device 14, file parsing unit 31 may be separate from destination device 14. For instance, file parsing unit 31 may be implemented in a network device, such as a Media Aware Network Element (MANE), content delivery network device, or another type of network entity.

Display device 32 may be integrated with, or may be external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in an bitstream at the time of encoding, which then may be retrieved by a decoding device at any time after being stored to this medium.

Destination device 14 may receive the encoded video data to be decoded via link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, output interface 22 may output encoded data to a storage device 33. Similarly, input interface 28 may access encoded data storage device 33. Storage device 33 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 33 may correspond to a file server or another intermediate storage device that may hold the encoded video generated by source device 12. Destination device 14 may access stored video data from storage device 33 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 33 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video data for storage on a data storage medium, decoding of digital video data stored on a data storage medium, or other applications. In some examples, system 10 may be configured to support one-way or two-way video transmission to support applications such as video streaming, video playback, video broadcasting, and/or video telephony.

Furthermore, in the example of FIG. 1, video coding system 10 includes a file generation device 34. File generation device 34 may receive encoded video data generated by source device 12. File generation device 34 may generate a file that includes the encoded video data. Destination device 14 may receive the file generated by file generation device 34. In various examples, file generation device 34 may include various types of computing devices. For instance, file generation device 34 may comprise a video encoding device, a Media Aware Network Element (MANE), a server computing device, a personal computing device, a special-purpose computing device, a commercial computing device, or another type of computing device. In some examples, file generation device 34 is part of a content delivery network. In some examples, file generation device 34 is implemented as part of source device 12. File generation device 34 may receive the encoded video data from source device 12 via a channel such as link 16. Furthermore, destination device 14 may receive the file from file generation device 34 via a channel such as link 16. File generation device 34 may be considered a video device. As shown in the example of FIG. 1, file generation device 34 may comprise a memory 36 configured to store a file that contains encoded video contents. In some examples, file generation device 34 may be implemented in circuitry, or a combination of hardware circuitry and software.

In other examples, source device 12 or another computing device may generate a file that includes the encoded video data. However, for ease of explanation, this disclosure describes file generation device 34 as generating the file. Nevertheless, it should be understood that descriptions of file generation device 34 generating the file are applicable to computing devices in general.

In some examples, a MANE, server, or other type of device may comprise a memory configured to store a file generated in accordance with the techniques of this disclosure. This device may process the file (e.g., by obtaining syntax elements from the file) and use the obtained syntax elements for various purposes, such as for forwarding particular content within the file to another device, such as destination device 14.

Video encoder 20 and video decoder 30 may operate according to a video compression standard, such as the High Efficiency Video Coding (HEVC) standard or an extension thereof. The HEVC standard may also be referred to as ISO/IEC 23008-2. The design of HEVC has been finalized by the Joint Collaboration Team on Video Coding (JCT-VC) of ITU-T Video Coding Experts Group (VCEG) and ISO/IEC Motion Picture Experts Group (MPEG). Video encoder 20 and video decoder 30 may operate according to one or more of these standards or other standards. Such other video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In general, in HEVC, a video frame or picture may be divided into a sequence of treeblocks or largest coding units (LCU) that include both luma and chroma samples. Treeblocks may also be referred to as Coding Tree Units (CTUs). A treeblock has a similar purpose as a macroblock of the H.264/AVC standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of a CTU, with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node (i.e., coding block) of a CU. In some specific cases, this disclosure may also use the term "video block" to refer to a treeblock, i.e., LCU, or a CU, which includes a coding node and PUs and TUs.

A video sequence typically includes a series of video frames or pictures. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may output a bitstream that includes a sequence of bits that forms a representation of coded pictures and associated data. The term "bitstream" may be a collective term used to refer to either a Network Abstraction Layer (NAL) unit stream (e.g., a sequence of NAL units) or a byte stream (e.g., an encapsulation of a NAL unit stream containing start code prefixes and NAL units as specified by Annex B of the HEVC standard). A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate an RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a slice segment, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. Any NAL unit other than a VCL NAL unit may be referred to as a non-VCL NAL unit. NAL units that contain parameter sets (e.g., video parameter sets (VPSs), sequence parameter sets (SPSs), PPSs, or other types of parameter sets) may be referred to as parameter set NAL units.

This disclosure may refer to a NAL unit that encapsulates an RBSP for a segment slice as a coded slice NAL unit. As defined in HEVC, a slice segment is an integer number of CTUs ordered consecutively in tile scan and contained in a single NAL unit. In contrast, in HEVC, a slice may be an integer number of CTUs contained in one independent slice segment and all subsequent dependent slice segments (if any) that precede the next independent slice segment (if any) within the same access unit. An independent slice segment is a slice segment for which values of the syntax elements of the slice segment header are not inferred from the values for a preceding slice segment. A dependent slice segment is a slice segment for which the values of some syntax elements of the slice segment header are inferred from the values for the preceding independent slice segment in decoding order. The RBSP of a coded slice NAL unit may include a slice segment header and slice data. A slice segment header is a part of a coded slice segment containing the data elements pertaining to the first or all CTUs represented in the slice segment. A slice header is a slice segment header of the independent slice segment that is a current slice segment or the most recent independent slice segment that precedes a current dependent slice segment in decoding order.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU.

Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As discussed above, video encoder 20 may generate a bitstream that comprises a series of NAL units. In multi-layer video coding, different NAL units of the bitstream may be associated with different layers of the bitstream. A layer may be defined as a set of VCL NAL units and associated non-VCL NAL units that have the same layer identifier. For instance, NAL units may include headers (i.e., NAL unit headers) and payloads (e.g., RBSPs). The NAL unit headers may include layer identifier syntax elements (e.g., nuh_layer_id syntax elements in HEVC). NAL units that have layer identifier syntax elements that specify different values belong to different "layers" of a bitstream. Thus, in multi-layer coding (e.g., MV-HEVC, SVC, or SHVC), the layer identifier syntax element of the NAL unit specifies a layer identifier (i.e., a layer ID) of the NAL unit.

A layer may be equivalent to a view in multi-view video coding. In multi-view video coding, a layer can contain all view components of the same layer, with different time instances (e.g., different output times). In multi-layer video coding, the term "access unit" may refer to a set of pictures that correspond to the same time instance. For instance, all pictures in an access unit may have the same output time. Thus, a "view component" may be a coded representation of a view in a single access unit.

In some examples, a view component may comprise a texture view component (i.e., a texture picture) or a depth view component (i.e., a depth picture). In some examples of multi-view video coding, a layer contains either coded depth pictures of a specific view or coded texture pictures of a specific view, but not both depth pictures and texture pictures. In other examples of multi-view video coding, a layer contains both texture view components and depth view components of a specific view.

In the context of scalable video coding, a layer typically corresponds to coded pictures having video characteristics different from coded pictures in other layers. Such video characteristics typically include spatial resolution and quality level (e.g., Signal-to-Noise Ratio).

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream (e.g., a layer associated with a highest layer identifier) may be removed from the bitstream without affecting the decodability of data in the remaining layers of the bitstream. In multi-layer video coding, a layer may be referred to as a "base layer" if a video decoder can decode pictures in the layer without reference to data of any other layer. In HEVC and other video coding specifications, a layer identifier of a NAL unit is equal to 0 if the NAL unit is in a base layer. If the NAL unit does not relate to a base layer in multi-layer coding, the layer identifier of the NAL unit may have a non-zero value.

In scalable video coding, layers other than the base layer may be referred to as "enhancement layers" and may provide information that enhances the visual quality of video data decoded from the bitstream. Scalable video coding can enhance spatial resolution, signal-to-noise ratio (i.e., quality) or temporal rate.

Multi-layer video coding may support inter-layer prediction. Inter-layer prediction is similar to the inter prediction used in HEVC and other video coding specifications and may use the same syntax elements. However, when a video coder performs inter-layer prediction on a current video unit (such as a PU), the video coder may use, as a reference picture, a picture that is in the same access unit as the current video unit, but in a different layer. In contrast, conventional inter prediction only uses pictures in different access units as reference pictures. When coding a picture in one of the non-base layer, a video coder may add a picture into a reference picture list if the picture is in a different layer but within a same time instance (i.e., access unit) as the picture that the video coder is currently coding.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer," "temporal layer," or a "temporal sub-layer." Thus, temporal scalability may be achieved within one layer by defining a group of pictures with a particular temporal level as a sub-layer (i.e., temporal layer). NAL units may include temporal identifier (e.g., temporal_id in HEVC) syntax elements. The temporal identifier syntax element of a NAL unit specifies a temporal identifier of the NAL unit. The temporal identifier of a NAL unit identifies a temporal sub-layer with which the NAL unit is associated. Thus, each temporal sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. In some examples, each operation point of a bitstream may be associated with a set of layer identifiers (e.g., a set of nuh_layer_id values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. Thus, an operation point may be a bitstream created from another bitstream by operation of the sub-bitstream extraction process with another bitstream, a target highest TemporalId, and a target layer identifier list as inputs to the sub-bitstream extraction process. The operation point may include each NAL unit that is associated with the operation point. The operation point does not include VCL NAL units that are not associated with the operation point.

File formats and file format standards will now be briefly discussed. File format standards include the ISO base media file format ("Information technology—Coding of audio-visual objects—Part 12: ISO base media file format," ISO/IEC 14496-12, fifth edition, Feb. 20, 2015, hereinafter, "ISO/IEC 14996-12") and other file format standards derived from ISOBMFF, including MPEG-4 file format ("Information technology—Coding of audio-visual objects—Part 14: MP4 file format," ISO/IEC 14496-14, First Edition, Nov. 15, 2003, hereinafter, "ISO/IEC 14496-14"), 3GPP file format (3GPP TS 26.244) and a file format for video compression based on Network Abstraction Layer (NAL) units ("Information technology—Coding of audio-visual objects—Part 15: Carriage of network abstraction layer (NAL) unit structure video in the ISO base media file format" ISO/IEC 14496-15:2014(E), hereinafter "ISO/IEC 14996-15"). Thus, ISO/IEC 14496-12 specifies the ISO base media file format. Other documents extend the ISO base media file format for specific applications. For instance, ISO/IEC 14496-15 describes the carriage of NAL unit structured video in the ISO base media file format. H.264/AVC and HEVC, as well as their extensions, are examples of NAL unit structured video. ISO/IEC 14496-15 includes sections describing the carriage of H.264/AVC NAL units. Additionally, section 8 of ISO/IEC 14496-15 describes the carriage of HEVC NAL units. Thus, section 8 of ISO/IEC 14496-15 is said to describe the HEVC file format. After the 114$^{th}$ MPEG meeting, based on comments received from several national bodies, a disposition document was prepared that contains some changes to the ISO/IEC 14496-15 that will be applied to the new version of the ISO/IEC 14496-15 draft specification. This disposition document is referred to as "MPEG output document N15297."

ISOBMFF is used as the basis for many codec encapsulation formats, such as the AVC File Format, as well as for many multimedia container formats, such as the MPEG-4 File Format, the 3GPP File Format (3GP), and the DVB File Format. In addition to continuous media, such as audio and video, static media, such as images, as well as metadata, can be stored in a file conforming to ISOBMFF. Files structured according to ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. Thus, although originally designed for storage, ISOBMFF has proven valuable for streaming, e.g., for progressive download or DASH. For streaming purposes, movie fragments defined in ISOBMFF can be used. In addition to continuous media, such as audio and video, static media, such as images, as well as metadata can be stored in a file conforming to ISOBMFF.

Figure 8:
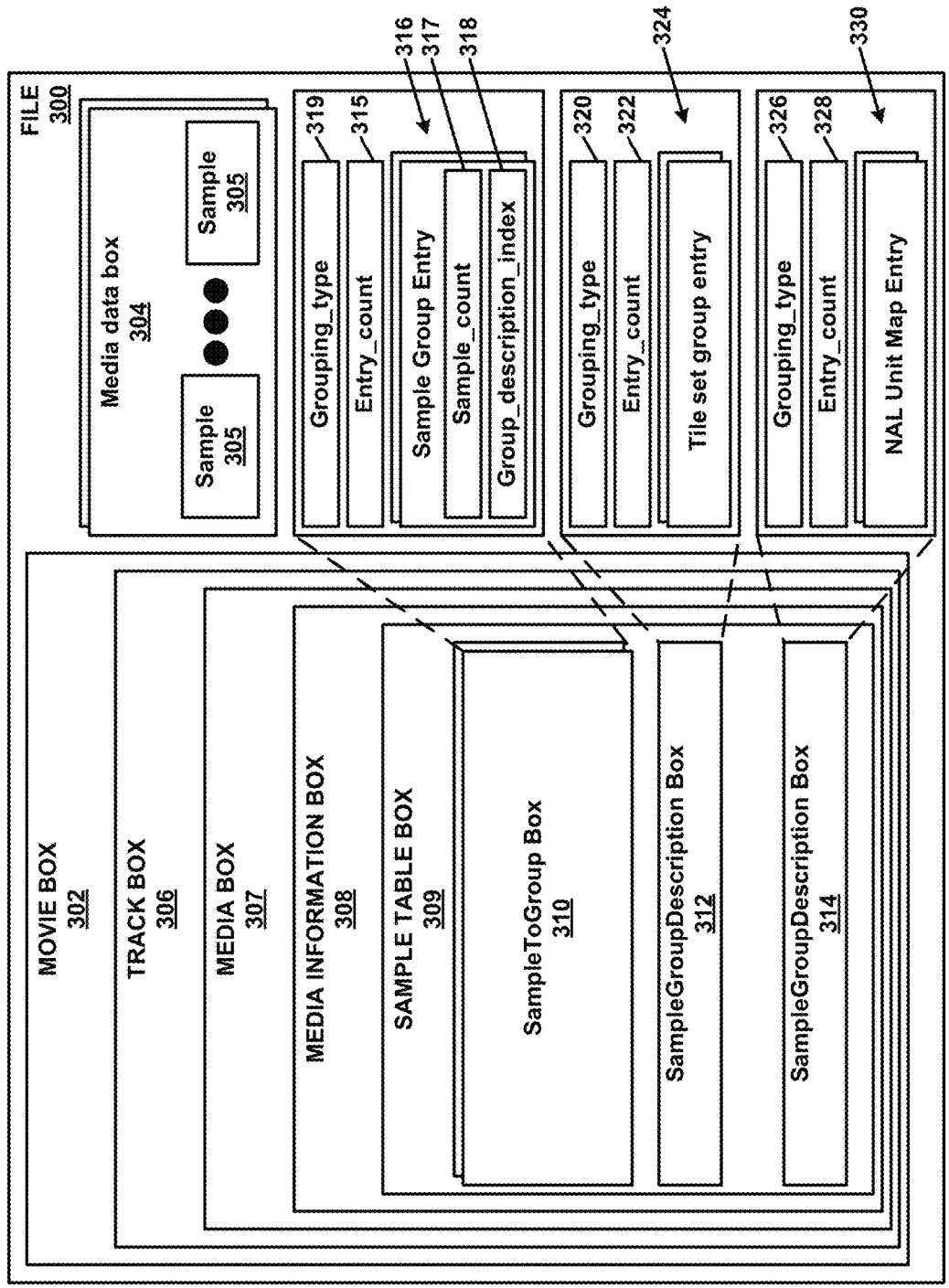
FIG. 8 is a conceptual diagram illustrating an example structure of a file, in accordance with one or more techniques of this disclosure.
Figure 9:
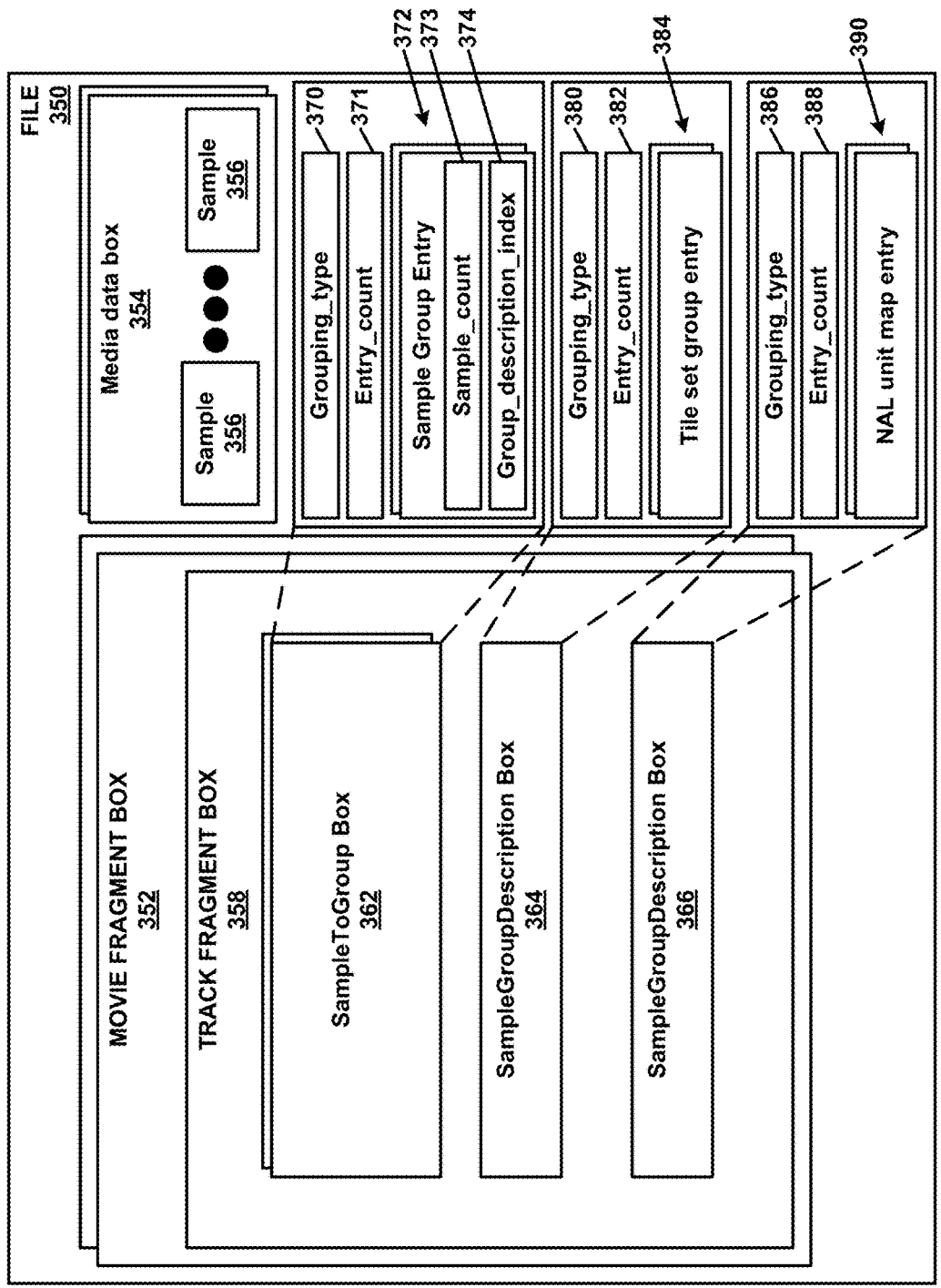
FIG. 9 is a conceptual diagram illustrating an example structure of a file, in accordance with one or more techniques of this disclosure.

A file conforming to the HEVC file format may comprise a series of objects, called boxes. A box may be an object-oriented building block defined by a unique type identifier and length. A box is the elementary syntax structure in ISOBMFF and may include a four-character coded box type, a byte count of the box, and a payload. In other words, a box may be a syntax structure comprising a coded box type, a byte count of the box, and a payload. In some instances, all data in a file conforming to the HEVC file format may be contained within boxes and there may be no data in the file that is not in a box. Thus, an ISOBMFF file may consist of a sequence of boxes, and boxes may contain other boxes. For instance, the payload of a box may include one or more additional boxes. FIG. 8 and FIG. 9, described in detail elsewhere in this disclosure, show example boxes within a file, in accordance with one or more techniques of this disclosure.

A file conforming to ISOBMFF may include various types of boxes. For example, a file conforming to ISOBMFF may include a file type box, a media data box, a movie box, a movie fragment box, and so on. In this example, a file type box includes file type and compatibility information. A media data box may contain samples (e.g., coded pictures). A Movie box ("moov") contains metadata for continuous media streams present in the file. Continuous media streams may be represented in the file as a track. For instance, a movie box may contain metadata regarding a movie (e.g., logical and timing relationships between samples, and also pointers to locations of samples). Movie boxes may include several types of sub-boxes. The sub-boxes in a movie box may include one or more track boxes. A track box may include information about an individual track of a movie. A track box may include a track header box that specifies overall information of a single track. In addition, a track box may include a media box that contains a media information box. The media information box may include a sample table box that contains data indexing media samples in the track. Information in the sample table box may be used to locate samples in time and, for each of the samples of the track, a type, size, container, and offset into that container of the sample. Thus, the metadata for a track is enclosed in a Track box ("trak"), while the media content of a track is either enclosed in a Media Data box ("mdat") or directly in a separate file. The media content for tracks comprises or consists of a sequence of samples, such as audio or video access units.

The ISOBMFF specifies the following types of tracks: a media track, which contains an elementary media stream, a hint track, which either includes media transmission instructions or represents a received packet stream, and a timed metadata track, which comprises time-synchronized metadata. The metadata for each track includes a list of sample description entries, each providing the coding or encapsulation format used in the track and the initialization data used for processing that format. Each sample is associated with one of the sample description entries of the track.

The ISOBMFF enables specifying sample-specific metadata with various mechanisms. Specific boxes within the Sample Table box ("stbl") have been standardized to respond to common needs. The Sample Table box contains a sample table that contains all the time and data indexing of the media samples in a track. Using the tables in the Sample Table box, it may be possible to locate samples in time, determine their type (e.g. I-frame or not), and determine their size, container, and offset into that container.

For example, a Sync Sample box ("stss") is a box within a Sample Table box. The Sync Sample box is used to list the random access samples of the track. This disclosure may refer to a sample listed by the Sync Sample box as a sync sample. In another example, a sample grouping mechanism enables mapping of samples according to a four-character grouping type into groups of samples sharing the same property specified as a sample group description entry in the file. Several grouping types have been specified in ISOBMFF.

The ISOBMFF specification specifies six types of Stream Access Points (SAPs) for use with DASH. The first two SAP types (types 1 and 2), correspond to IDR pictures in H.264/AVC and HEVC. The third SAP type (type 3) corresponds to open-Group of Pictures (GOP) random access points, hence Broken Link Access (BLA) or Clean Random Access (CRA) pictures in HEVC. The fourth SAP type (type 4) corresponds to gradual decoding refresh (GDR) random access points.

A Movie Fragment box is a top-level box. Each Movie Fragment box provides information that would have previously been in the Movie box. A Movie Fragment box may contain one or more track fragment ("traf") boxes. Within the Movie Fragment there is a set of track fragments, zero or more per track. The track fragments in turn contain zero or more track runs, each of which documents a contiguous run of samples for that track. For instance, each track run may contain samples of pictures that are contiguous in a certain order, such as decoding order. A track fragment box is defined in the 14496-12 specification and comprises metadata for one or more track fragments. For instance, a track fragment box may include a track fragment header box indicating a track ID, a base data offset, a sample description index, a default sample duration, a default sample size, and default sample flags. A track fragment box may include one or more track fragment run boxes, each documenting a contiguous set of samples for a track. For instance, a track fragment box may include syntax elements indicating a sample count, a data offset, sample flags, a sample duration, a sample size, sample composition time offset, and so on. Within these structures, many fields are optional and can be defaulted.

A sample table box may include one or more SampleToGroup boxes and one or more sample group description boxes (i.e., SampleGroupDescription boxes). In this disclosure, SampleToGroup boxes may be referred to as "Sample to Group boxes" and SampleGroupDescription boxes may be referred to as "Sample Group Description boxes." In general terms, a SampleToGroup box includes syntax elements defining one or more groups of samples. In this disclosure, groups of samples may also be referred to as "sample groups" or "sample groupings." Furthermore, in general terms, a SampleGroupDescription box includes descriptions of sample groups.

A SampleToGroup box may be used to determine a sample group to which a sample belongs, along with an associated description of the sample group. In other words, a SampleToGroup box may indicate a group to which a sample belongs. A SampleToGroup box may have a box type of "sbgp." A SampleToGroup box may include a grouping type element (e.g., grouping_type). In some instances, in this disclosure, an element of a box may also be referred to as a syntax element. The grouping type element may be an integer that identifies a type (i.e., a criterion used to form the sample groups) of a sample grouping. Furthermore, a SampleToGroup box may include one or more entries (i.e., sample group entries). Each sample group entry in a SampleToGroup box may be associated with a different, non-overlapping series of consecutive samples in the track. Each sample group entry may indicate a sample count element (e.g., sample_count) and a group description index element (e.g., group_description_index). The sample count element of a sample group entry may indicate a number of samples associated with the sample group entry. In other words, the sample count element of the sample group entry may be an integer that gives the number of consecutive samples with the same sample group descriptor. The group description index element may identify, within a SampleGroupDescription box, a group description entry that contains a description of the samples associated with the sample group entry. The group description index elements of multiple sample group entries may identify the same SampleGroupDescription box.

A SampleGroupDescription box also includes a grouping type syntax element. When the grouping type syntax elements of a SampleToGroup box and a SampleGroupDescription box match, the SampleToGroup box and the SampleGroupDescription box are said to correspond to one another. A SampleGroupDescription box includes one or more group description entries. Each respective group description entry in a SampleGroupDescription box includes a description of a respective sample group. A group description index in a SampleToGroup box identifies a corresponding group description entry in the corresponding SampleGroupDescription box.

For example, a SampleToGroup box may have a first sample group entry that includes a sample count syntax element having a value equal to 5 and a group description index having a value equal to 3. Hence, in this example, five consecutive samples belong to a sample group described by a group description entry with index 3 in the corresponding SampleGroupDescription box. In this example, the SampleToGroup box may have a second sample group entry that includes a sample count syntax element having a value equal to 4 and a group description index having a value equal to 2. Hence, in this example, the next four consecutive samples belong to a sample group described by the sample group description entry with index 2 in the corresponding SampleGroupDescription box.

In ISO/IEC 14496-15 for storage of L-HEVC layers in the file format, a list of operation points available for a bitstream in a file is described using the operation point ('oinf') sample group that is signaled in one of the tracks carrying the bitstream. The operation point sample group may also be referred to herein as the "operation point information sample group." An application can find a track containing an 'oinf' sample group by following an 'oref' track reference. For simplicity, the track that contains the 'oinf' sample group is also referred to as the 'oref' track. Although the 'oinf' sample group is signaled only in one track, in ISO/IEC 14496-15 for storage of L-HEVC layers, the scope of the 'oinf' sample group covers all tracks that carry L-HEVC coded data. Signaling the list of operation points using a sample group has a consequence such that the list of operation points may not cover the whole bitstream in the temporal dimension. More than one 'oinf' sample group may be present and each sample group includes a different set of samples.

Another example sample group is a layer information ("linf") sample group. A sample group description entry for a layer information sample group comprises a list of layers and sub-layers that a track contains. Each sample of a track that contains a coded picture of a layer may be part of a 'linf' sample group of the track. There may be one or more 'linf' sample group entries in a sample group description box for a track. However, it may be a requirement that there is one 'linf' sample group description entry for each track that includes L-HEVC data. The following provides a syntax and semantics for a sample group description entry for a 'linf' sample group.

9.8.2.2 Syntax

```
class LayerInfoGroupEntry extends VisualSampleGroupEntry ('linf')) {
    unsigned int (2) reserved;
    unsigned int (6) num_layers_in_track;
    for (i=0; i<num_layers_in_track; i++) {
        unsigned int (4) reserved;
        unsigned int (6) layer_id;
        unsigned int (3) min_sub_layer_id;
        unsigned int (3) max_sub_layer_id;
    }
}
```

9.8.2.3 Semantics num_layers_in_track: The number of layers carried in any sample of this track associated with this sample group.

layer_id: Layer IDs for the layers carried in associated samples. The instances of this field shall be in ascending order in the loop.

min_sub_layer_id: The minimum TemporalId value for the sub-layers in the layer within the track.

1. max_sub_layer_id: The maximum TemporalId value for the sub-layers in the layer within the track.
2. Let layerList be the list of layer IDs of layers that are carried in this track and the layer IDs of layers that are carried in other tracks and that are referred to by layers carried in this track directly or indirectly. The layer IDs in the layerList are ordered in ascending order of layer ID values. For example, suppose that this track carries layers with layer IDs 4 and 5 and they refer to layers with layer ID equal to 0 and 1, then the layerList associated with this track is {0, 1, 4, 5}.

Figure 2:
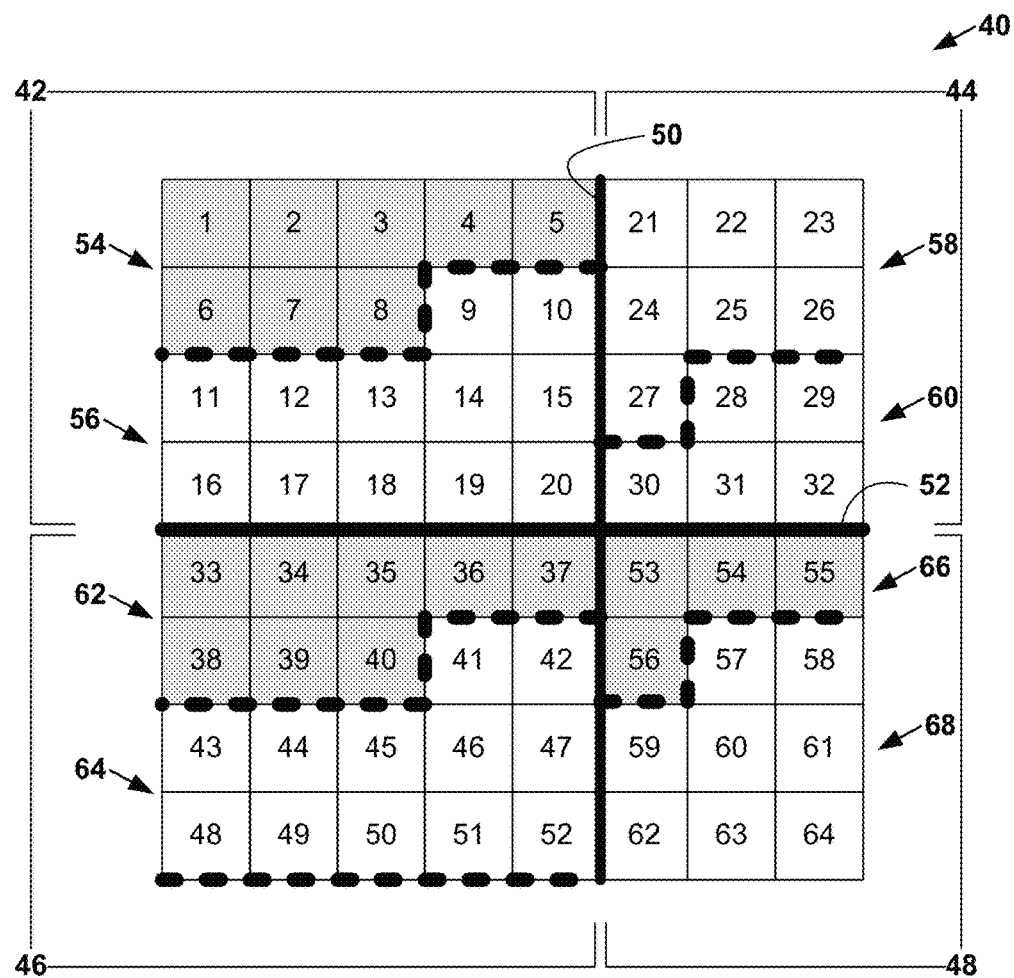
FIG. 2 is a conceptual diagram illustrating example tiles and slices.

As described in section 3.160 of HEVC, a tile is a rectangular region of coding tree blocks within a particular tile column and a particular tile row in a picture. HEVC tiles do not have coding dependencies with other HEVC tiles in the same coded picture but may have coding dependencies with other HEVC tiles from previous coded pictures or may be independently decoded. FIG. 2 is a conceptual diagram illustrating example tiles and slices. In the example of FIG. 2, a picture 40 has 64 luma CTBs, each represented as a small square. Furthermore, picture 40 has four tiles, 42, 44, 46, 48 separated by a vertical tile boundary 50 and a horizontal tile boundary 52. Tiles 42 and 44 form a first tile row and tiles 46 and 48 form a second, different tile row. Moreover, tiles 42 and 46 form a first tile column and tiles 48 and 50 form a second, different tile column. Tile boundaries are represented as thick lines in FIG. 2.

In the example of FIG. 2, no CTB in tile 46 may depend on a CTB in tile 42, even if the CTB in tile 42 is adjacent to the CTB in tile 46. A tile column is a rectangular region of coding tree blocks having a height equal to the height of the picture and a width specified by syntax elements (e.g., in the picture parameter set). A tile row is a rectangular region of coding tree blocks having a height specified by syntax elements (e.g., in the picture parameter set) and a width equal to a width of the picture.

Picture 40 has eight slice segments 54, 56, 58, 60, 62, 64, 66, and 68. In the example of FIG. 2, slice segment boundaries are indicated with dashed lines. Furthermore, in the example of FIG. 2, slice segments with shaded CTBs are independent slice segments and slice segments with white CTBs are dependent slice segments. In HEVC, each coded block of a slice segment is contained in a NAL unit for the slice segment. Furthermore, in HEVC, a NAL unit does not include coded blocks of multiple slice segments.

In the example of FIG. 2, the numbers in each of the CTBs indicates a coding order of the CTBs. As shown in FIG. 2, tile boundaries may change the coding order of CTBs in picture 40. For instance, in the absence of tile boundaries 50 and 52, a video coder may code all CTBs in a complete row of CTBs in picture 40 before coding any CTB of the next lower row of CTBs in picture 40.

As described in Section 6.3.1 of HEVC, unlike slices, tiles are always rectangular. A tile always contains an integer number of coding tree units, and may consist of coding tree units contained in more than one slice. Similarly, a slice may comprise or consist of CTUs contained in more than one tile. Furthermore, as described in Section 6.3.1 of HEVC, one or both of the following conditions shall be fulfilled for each slice and tile: (1) all coding tree units in a slice belong to the same tile; and (2) all CTUs in a tile belong to the same slice. Additionally, one or both of the following conditions shall be fulfilled for each slice segment and tile: (1) all CTUs in a slice segment belong to the same tile; and (2) all CTUs in a tile belong to the same slice segment.

Scenarios exist where it is useful to obtain information about tiles at the file level, as opposed to determining the information about the tiles at a codec (e.g., HEVC) level. For example, in FIG. 2, suppose that tiles 46 and 48 correspond to the crawl at the bottom of a newscast while tiles 42 and 44 contain images of a news anchorperson. In this example, the crawl may include text about other news, sports scores, school closings, stock quotes, etc. In this example, it may be desirable to stream only the part of picture 40 that includes the images of the news anchorperson without streaming the crawl. Reducing the streamed content of a video in this manner may be desirable when streaming the video to a device with a small screen, such as a smartphone or smartwatch. At the same time, the full version of the same video, which includes tiles 46 and 48, may be streamed to a device for presentation on a larger screen, such as a television.

Accordingly, ISO/IEC 14496-15 describes tools for describing and manipulating tiles at the file level. Particularly, section 10.1 of ISO/IEC 14496-15 defines the concepts of a tile region and a tile set. A tile region is a rectangular region that includes one or more tiles. For instance, in the example of FIG. 2, tiles 42 and 44 may form a tile region; tiles 42 and 46 may form a tile region, tiles 44 and 48 may form a tile region, tiles 46 and 48 may form a tile region, and tiles 42, 44, 46, and 48 may form a tile region. Several tiles coded in a single slice can be grouped as a set of tiles, called a tile set. For instance, in the example of FIG. 2, a tile set may consist of tile 42, tile 46, and tile 48. However, in the example of FIG. 2, tile 42, tile 46, and tile 48 cannot form a tile region because tiles 42, 46 and 48 are not a single rectangular region.

Tile sets can be used to represent a region of interest spanning over several HEVC tiles. For example, a tile set may consist of tiles 42, 44, and 46. In this example, tiles 42, 44, and 46 may correspond to live video streams while tile 48 includes an image that is static over many pictures.

Furthermore, as described in section 10.1 of ISO/IEC 14496-15, tile regions and tile sets are described using SampleGroupDescription boxes. In other words, in section 10.1 of ISO/IEC 14496-15, SampleGroupDescription boxes may specify tile regions and tile sets. More specifically, a tile region of a video track is described using a TileRegionGroupEntry sample description group. A tile set is described using a TileSetGroupEntry sample description group. A tile region may be a member of multiple tile sets. A TileSetGroupEntry can be used to define: a set of tile regions, with or without coding dependencies; a set of HEVC tiles which are coded by one or several NAL units, for example multiple HEVC tiles in a slice; and coding dependencies between multiple tile regions.

Individual NALUs may be associated with:

a tile region (i.e., when an HEVC tile is coded as a set of slices)

a tile set (i.e., when a slice contains coding blocks for several HEVC tiles).

Association between samples, NAL units (NALUs), tile regions and tile sets may be done through SampleToGroup and NALUMapEntry boxes.

In ISO/IEC 14496-15, the NALUMapEntry box has the following syntax:

```
class NALUMapEntry( ) extends VisualSampleGroupEntry ('nalm') {
    unsigned int(6) reserved = 0;
    unsigned int(1) large_size;
    unsigned int(1) rle;
    if (large_size) {
        unsigned int(16) entry_count;
    } else {
        unsigned int(8) entry_count;
    }
    for (i=1; i<= entry_count; i++) {
        if (rle) {
            if (large_size) {
                unsigned int(16) NALU_start_number;
            } else {
                unsigned int(8) NALU_start_number;
            }
        }
        unsigned int(16) groupID;
    }
}
```

Furthermore, ISO/IEC 14496-15 defines the semantics of the NALUMapEntry box as follows:

large_size indicates whether the number of NAL units entries in the track samples is represented in 8 or 16 bits.

rle indicates whether run-length encoding is used (1) to assign groupID to NAL units or not (0).

entry_count specifies the number of entries in the map. Note that when rle is equal to 1, the entry_count corresponds to the number of runs where consecutives NAL units are associated with the same group. When rle is equal to 0, entry_count represents the total number of NAL units.

NALU_start_number is the 1-based NALU index in the sample of the first NALU in the current run associated with groupID.

groupID indicates the corresponding scalable, multiview, tile region or tile set group entry, as indicated in the sample group descriptions. If the groupID is 0, no group is associated to these identified NALUs.

Each sample description group is assigned a unique identifier, called groupID. This identifier can be used to associate NAL units with the corresponding tile region or tile set using ScalableNALUMapEntry or NALUMapEntry sample description groups. Tile regions and tile sets share the same namespace for groupID, scoped by the base HEVC layer. That is, in ISO/IEC 14496-15, there shall not be two tile regions or tile sets with the same groupID in any tracks having the same base layer.

As noted above, the NALUMapEntry box includes an rle syntax element and an entry_count syntax element. The rle syntax element indicates whether or not run-length encoding is used to assign groupIDs to NAL units. In the context of a NALUMapEntry box, a run is a series of consecutive NAL units assigned the same groupID. When run-length encoding is used to assign groupIDs to NAL units, the NALUMapEntry box includes a respective NALU_start_number syntax element for each respective run. For example, suppose a set of six consecutive NAL units starting from a NAL unit with index 2 is assigned a groupID equal to 11. In this example, the NALUMapEntry box may include a first NALU_start_number syntax element indicating a value equal to 2, followed by a groupID syntax element having a value equal to 11, followed by a second NALU_start_number syntax element equal to 8. Thus, in this example, a device interpreting a file containing the NALUMapEntry box, such as file parsing unit 31 (FIG. 1), may determine that each NAL unit from index 2 to index 7 is assigned the groupID equal to 11.

ISO/IEC 14496-15 specifies the syntax of a TileRegionGroupEntry box as follows:

```
class TileRegionGroupEntry( ) extends VisualSampleGroupEntry
('trif')
{
    unsigned int(16)  groupID;
    unsigned int(2)   independent_flag;
    unsigned int(1)   full_picture;
    unsigned int(1)   filtering_disabled;
    unsigned int(4)   reserved=0;
    if (!full_picture)    {
        unsigned int(16)  horizontal_offset;
        unsigned int(16)  vertical_offset;
    }
    unsigned int(16)  region_width;
    unsigned int(16)  region_height;
}
```

ISO/IEC 14496-15 specifies the semantics of a TileRegionGroupEntry box as follows:

groupID is a unique identifier for the tile region described by this group. Value 0 is reserved for special use in the 'nalm' box.

independent_flag specifies the coding dependencies between this tile region and other tile regions in the current picture and in reference pictures of the same layer. Inter-tile dependencies, if any, are indicated by means of dependency_list in TileSetGroupEntry. This flag takes the following values:
  If independent_flag equals 0, the coding dependencies between this tile region and other tiles in the same picture or previous pictures is either described at the tile set level or unknown.
  If independent_flag equals 1, there are no temporal dependencies between this tile region and the other tile regions or tile sets with different groupID in any reference pictures but there can be coding dependencies between this tile and the tile region with the same groupID in the reference pictures.
  If independent_flag equals 2, there are no coding dependencies between this tile region and any other tiles in the reference pictures.
  Value 3 is reserved.

full_picture, when set, indicates that this tile region is actually a complete picture, in which case region_width and region_height shall be set to the layer luma size, and independent_flag shall be set to 1. This allows expressing dependencies between tiles of a layer to a non-tiled layer using the 'tsif' sample group referencing a 'trif' sample group with full_picture parameter set to 1.

filtering_disable, when set, indicates that no post-decoding filtering operation on this tile region require access to pixels adjacent to this tile region, i.e., bit-exact reconstruction of the tile region is possible without decoding the adjacent tiles.

horizontal_offset and vertical_offset give respectively the horizontal and vertical offsets of the top-left pixel of the rectangular region represented by the tile region, relative to the top-left pixel of the picture, in luma samples of the base region.

region_width and region_height give respectively the width and height of the rectangular region represented by the tile region, in luma samples of the base region.

Furthermore, ISO/IEC 14496-15 specifies the syntax of a TileSetGroupEntry box as follows:

```
class TileSetGroupEntry( ) extends VisualSampleGroupEntry
    ('tsif') {
    unsigned int(16) groupID;
    int(1) area_description;
    int(2) dependency_list;
    int (5) reserved;
    if (area_description==0) {
        unsigned int(16) tile_count;
        for (i=1; i<= tile_count; i++){
            unsigned int(16) tileGroupID;
        }
    } else {
        unsigned int(16) topLeftTileGroupId;
        unsigned int(16) bottomRightTileGroupId;
    }
    if ((dependency_list==1) || (dependency_list==3)) {
        unsigned int(16) dependency_tile_count;
        for (i=1; i<= dependency_tile_count; i++){
            unsigned int(16) dependencyTileGroupID;
        }
        if (dependency_list==3) {
            unsigned int(16) irap_dependency_tile_count;
            for (i=1; i<= irap_dependency_tile_count; i++){
                unsigned int(16) irap_dependencyTileGroupID;
            }
    } else if (dependency_list==2) {
        unsigned int(16) topLeftDependencyTileGroupId;
        unsigned int(16)
    bottomRightDependencyTileGroupId;
    }
}
```

ISO/IEC 14496-15 specifies the semantics of a TileSetGroupEntry box as follows:

groupID is a unique identifier for the tile set described by this group. Value 0 is reserved for special use in the 'nalm' box.

area_description indicates that the tile set is given as a rectangular area described by top-left and bottom-right corner.

dependency_list indicates that a list of dependent tile regions or tile sets for this tile set is given. If set to zero, this implies that there is no temporal coding dependencies between tiles from this set and tiles outside of this set. This ensures that decoding only the tiles from the set and from the dependency_list is possible without decoding other tiles. If set to 1 or 3, the dependency_list is provided as a list of identifiers for the dependent tiles. If set to 2, the dependency_list is expressed as the bounding box formed by the dependent tiles. If set to 3, an additional list of tile region or tile set dependencies is given for the case where the sample is a random access sample as defined for this HEVC layer.

tile_count gives the number of tiles defined in this tile set.

tileGroupID indicates the tile region groupID value (as defined by a TileRegionGroupEntry) or of the tile set groupID value (as defined by a TileSetGroupEntry) that belongs to this tile set.

topLeftTileGroupId indicates the top left tile groupID value of this tile set.

bottomRightTileGroupId indicates the bottom right tile groupID value of this tile set.

dependency_tile_count indicates the number of tile regions or tile sets in the dependency list.

dependencyTileGroupID gives the identifier of a tile region (as defined by a TileRegionGroupEntry) or a tile set (as defined by a TileSetGroupEntry) that this tile set depends on.

irap_dependency_tile_count and irap_dependencyTileGroupID specify the list of tile region or tile sets this tile set depends on when the sample this tile belongs to is a random access sample as defined for this HEVC layer.

topLeftDependencyTileGroupId indicates the top left tile region or tile set groupID value of the area on which this tile set depends.

bottomRightDependencyTileGroupId indicates the bottom right tile region or tile set groupID value of the area on which this tile set depends.

Tile regions may define a rectangular area, without holes. If a non-rectangular set of tiles is coded in a single HEVC slice, the set of tiles may be decomposed into different rectangular tile regions and described through a tile set, indicating dependencies to the related tile regions. The NAL units of such a slice may then be mapped to the tile set, but shall not be mapped to the tile region.

When used with movie fragments, TileRegionGroupEntry and TileSetGroupEntry can be defined for the duration of the movie fragments, by defining a new SampleGroupDescription box in the track fragment box, as defined in clause 8.9.4 of ISO/IEC 14496-12. However, there shall not be any TileRegionGroupEntry or TileSetGroupEntry in a track fragment that has the same groupID as a TileRegionGroupEntry or TileSetGroupEntry already defined.

Certain issues may arise in the above-described techniques for mapping between samples and tile regions. In other words, the tools described above with respect to manipulating tiles at the file level have several shortcomings. For example, a tile region can be considered a collection of tiles, whereas a tile set can be considered a collection of tile regions and also a collection of tiles. To determine the tiles that make up a particular tile region, one can simply check a NALUMapEntry. However, to determine tiles that make up a particular tile set, a device, such as file parsing unit 31, first has to check the list of tile regions that are listed as part of the tile set and then still has to check a NALUMapEntry to see if there are additional tiles that are also part of the tile set. Such an arrangement may make the relationship between tile region, tile set and NALUMapEntry complicated. Furthermore, currently it seems that there is no conceptual distinction between a tile region and a tile set except that a tile region must be of a rectangular shape, whereas a tile set may be of any shape. When the value of tile_reg_count of a tile set is equal to 0, the tile set is basically a tile region. Therefore, a simplification of NALUMapEntry, tile region, and tile set may be desirable.

In section 8.4.8 of ISO/IEC 14496-15, in the context of HEVC, a sub-sample is defined as:

For the use of the sub-sample information box (8.7.7 of ISO/IEC 14496-12) in an HEVC stream, a sub-sample is defined on the basis of the value of the flags field of the sub-sample information box as specified below. The presence of this box is optional; however, if present in a track containing HEVC data, the 'codec_specific_parameters' field in the box shall have the semantics defined here.

flags specifies the type of sub-sample information given in this box as follows:

0: NAL-unit-based sub-samples. A sub-sample contains one or more contiguous NAL units.

1: Decoding-unit-based sub-samples. A sub-sample contains exactly one decoding unit.

2: Tile-based sub-samples. A sub-sample either contains one tile and the associated non-VCL NAL units, if any, of the VCL NAL unit(s) containing the tile, or contains one or more non-VCL NAL units.

3: CTU-row-based sub-samples. A sub-sample either contains one CTU row within a slice and the associated non-VCL NAL units, if any, of the VCL NAL unit(s) containing the CTU row or contains one or more non-VCL NAL units. This type of sub-sample information shall not be used when entropy coding sync enabled flag is equal to 0.

4: Slice-based sub-samples. A sub-sample either contains one slice (where each slice may contain one or more slice segments, each of which is a NAL unit) and the associated non-VCL NAL units, if any, or contains one or more non-VCL NAL units.

Additionally, issues related to mapping of tiles in sub-sample to tile regions may arise in the above-described techniques. In the MPEG output document N15297 (disposition of comments for ISO/IEC 14496-15), it was agreed to allow sub-sample based identification of tiles to which the TileRegionGroupEntry applies. To support that, the syntax of TileRegionGroupEntry is modified in MPEG output document N15297 as shown in the text below. In the text below and throughout this disclosure, text between "<insert>" and "</insert> symbols corresponds to additions or modified existing texts (e.g., <insert>added text</insert>), while removed text is between "<delete>" and "</delete> symbols (e.g., <delete>deleted text</delete>).

```
class TileRegionGroupEntry( ) extends VisualSampleGroupEntry
('trif')
{
    <delete>unsigned   int(16) groupID;</delete>
    unsigned int(2)    independent_flag; [Ed. (YK): Name it
independent_idc.]
    unsigned int(1)    full_picture;
    unsigned int(1)    filtering_disabled;
    <insert>unsigned   int(1) nalu_flag;</insert>
    unsigned int(<insert>3</insert><insert>4</insert>) reserved=0;
    <insert>if (nalu_flag)
        unsigned int(16) groupID;
    else
        unsigned int(16) subsample_id;</insert>
    if (!full_picture) {
        unsigned int(16) horizontal_offset;
        unsigned int(16) vertical_offset;
    }
    unsigned int(16)   region_width;
    unsigned int(16)   region_height;
}
``` group ID is a unique identifier for the tile region described by this group. Value 0 is reserved for special use in the 'nalm' box.

independent_flag specifies the coding dependencies between this tile region and other tile regions in the current picture and in reference pictures of the same layer. Inter-tile dependencies, if any, are indicated by means of dependency_list in TileSetGroupEntry. This flag takes the following values:

If independent_flag equals 0, the coding dependencies between this tile region and other tiles in the same picture or previous pictures is either described at the tile set level or unknown.

If independent_flag equals 1, there are no temporal dependencies between this tile region and the other tile regions or tile sets with different groupID in any reference pictures but there can be coding dependencies between this tile and the tile region with the same groupID in the reference pictures.

If independent_flag equals 2, there are no coding dependencies between this tile region and any other tiles in the reference pictures.

Value 3 is reserved.

full_picture, when set, indicates that this tile region is actually a complete picture, in which case region_width and region_height shall be set to the layer luma size, and independent_flag shall be set to 1. This allows expressing dependencies between tiles of a layer to a non-tiled layer using the 'tsif' sample group referencing a 'trif' sample group with full_picture parameter set to 1.

nalu_flag equal to 0 specifies that tile regions are specified on the basis of tile-based sub-samples. nalu_flag equal to 1 specifies that tile regions are specified on the basis of groupID values of 'nalm' sample grouping.

subsample_id is a 1-based index to the sub-sample information of the mapped sample, as indicated in the Sub SampleInformationBox with flags equal to 2 (tile-based sub-samples).

The changes to TileRegionGroupEntry adopted in MPEG output document N15297 have two issues. Firstly, when the nalu_flag is equal to 0, the tile region group does not use NALUMapEntry, which means that all samples are associated with the tile region group because TileRegionGroupEntry does not have its own associated SampleToGroup box. Consequently, to make this sub-sample based identification of tiles work, a restriction is implied such that all the samples in the track must have the same NAL unit and also must have the same tile structure. In other words, all samples in the track must be partitioned into slices and tiles in the same way.

Secondly, having only one syntax element subsample_id means that only exactly one tile within a NAL unit can be part of a particular tile region group. When it is desirable to have more than one tile in a NAL unit included in a tile region, this signaling would be inefficient since more tile regions must be defined which later will be grouped by tile set.

Figure 3:
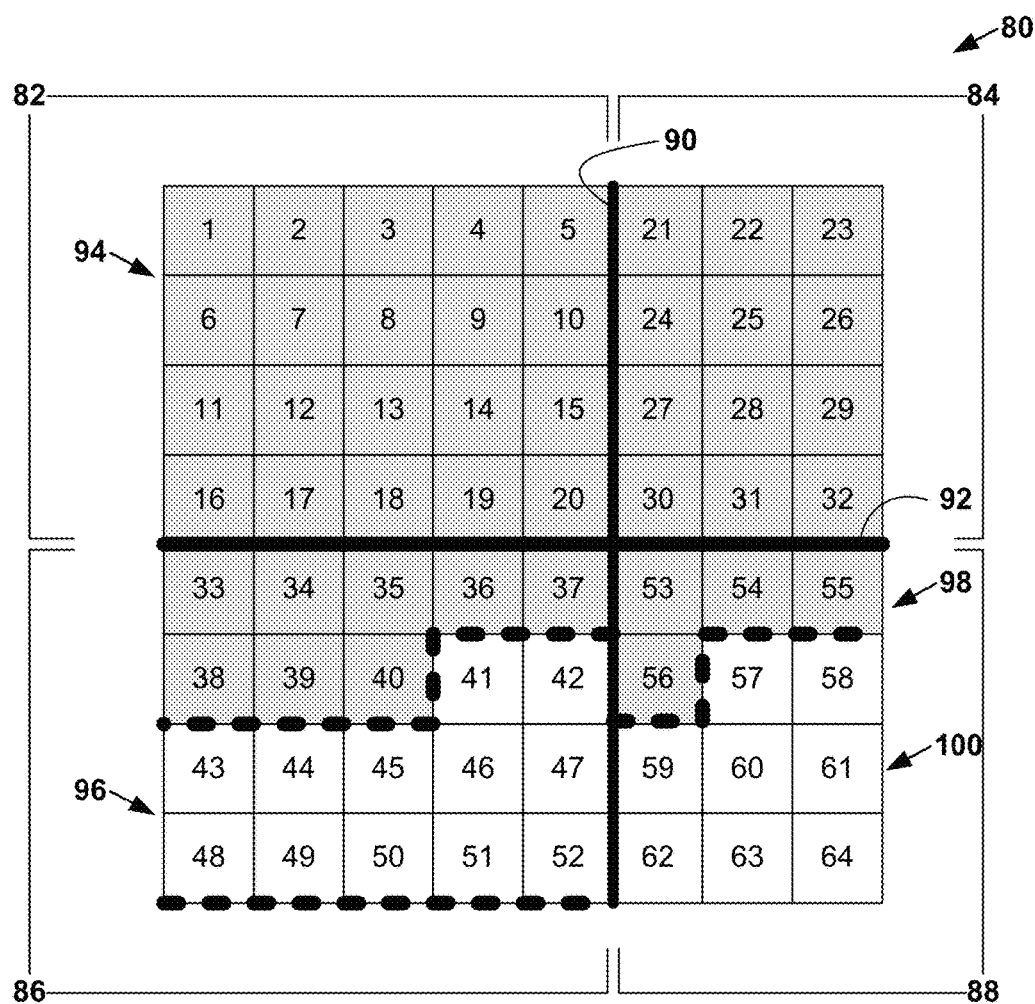
FIG. 3 is a conceptual diagram illustrating an example where a Network Abstraction Layer (NAL) unit includes multiple tiles.

For instance, FIG. 3 is a conceptual diagram illustrating an example where a NAL unit includes multiple tiles. In particular, a picture 80 has four tiles 82, 84, 86, and 88 separated by tile boundaries 90, 92. A slice segment 94 includes CTUs 1-40. Slice segments 96, 98, 100 include CTUs 41-64. Each encoded CTU of a slice segment is included in a NAL unit for the slice segment. In the example of FIG. 3, it may be desirable to have tiles 82 and 84 included in a tile region. In MPEG output document N15297, the subsample_id syntax element indicates which one of the sub-samples (e.g., tiles) in a picture is part of the tile region. For instance, the subsample_id syntax element equal to 0 may indicate the first tile of each picture in a tile region group associated with the TileRegionGroupEntry box. Since there is only one subsample_id syntax element in the TileRegionGroupEntry box, only one tile per picture can be included in the tile region group associated with the TileRegionGroupEntry box. Consequently, to arrive at a Sample Group that includes tiles 82 and 84, two TileRegionGroupEntry boxes may be generated, each including a subsample_id syntax element indicating a different one of tiles 82, 84. Additionally, a TileSetGroupEntry box would need to be generated that refers to the two TileRegionGroupEntry boxes.

Furthermore, issues related to tile region and tile set inter-layer dependency may arise in the above-described techniques. For instance, MPEG output document N15927 describes several changes related to the signaling of dependency information in tile regions and tile sets. Particularly, the following changes were agreed to in MPEG output document N15927:

a) It was agreed to change the name independent_flag to independent_idc.
    b) It was agreed to editorially edit the semantics of independent_idc when its value is equal to 2.
    c) It was agreed to use the signalling of dependency_list equal to 0 in all cases and remove the syntax and semantics related to dependency_list equal to 1 and 2.

Although the above agreed points may improve tile region and tile set dependency signaling, even after modification incorporating those agreed points, the following problem is still not addressed. Particularly, the current tile dependency signaling for tile regions and tile sets does not work when there is inter-layer dependency. For instance, as noted above, ISO/IEC 14496-15 specifies that when the dependency_list syntax element is "set to zero, this implies that there is no temporal coding dependencies between tiles from this set and tiles outside of this set. This ensures that decoding only the tiles from the set and from the dependency list is possible without decoding other tiles." However, nothing is indicated in ISO/IEC 14496-15 with respect to inter-view coding dependencies between tiles.

Furthermore, certain issues related to picture-level and upper-level non-VCL NAL units may arise in the above-described techniques. For instance, in above-described techniques, in ISO/IEC 14496-15, NALUMapEntry provides a mapping from NAL units to either tile region groups or tile set groups. There is one special case such that when a NAL unit is assigned groupID equal to 0, it means it is not associated with any tile region or tile set group. However, it is not clear what groupID should be assigned for a non-VCL NAL unit, particularly a non-VCL NAL unit that applies globally to all VCL NAL units of a picture, e.g., parameter sets. For such non-VCL NAL units, it seems that they cannot be mapped to groupID 0 as they would be needed for processing of each tile region or tile set group, and they can be assigned to a particular tile region or tile set either as that would make them not usable by other tile regions or tile sets.

To address the above issues and shortcomings, the following techniques are described. The techniques described below may be applied independently or may be applied in any feasible combination.

As mentioned above, the relationships between tile regions and tile sets may be overly-complicated. In accordance with a technique of this disclosure, to address this issue, the tile region concept is merged into the tile set concept. In other words, the concept of a tile region and the concept of a tile set are merged. In such examples where the concepts of tile regions and tile sets are merged, the terms tile region and tile set may be used interchangeably. Furthermore, in examples where the concepts of tile regions and tiles sets are merged, discussion of tile set group entries (e.g., TileSetGroupEntry boxes) and tile region group entries (e.g., TileRegionGroupEntry boxes) may be interchangeable. Hence, in such examples, either the TileSetGroupEntry box or the TileRegionGroupEntry box may be eliminated from the syntax used for defining the file and discussion of the TileRegionGroupEntry box may apply to the TileRegionGroupEntry box, or vice versa.

Furthermore, a syntax element may be signaled to indicate whether or not a region covered by tiles in a tile set is of rectangular shape. Thus, in this example, file generation device 34 may include, in a tile set group entry in the file, a syntax element (e.g., rectangular_flag) that indicates whether or not a region covered by tiles in a tile set is of rectangular shape. Similarly, file parsing unit 31 may obtain, from a tile set group entry in the file, a syntax element (e.g., rectangular_flag) that indicates whether or not a region covered by tiles in a tile set is of a rectangular shape. In this example, file parsing unit 31 may process the tile set based on the syntax element. For instance, based on the syntax element in a TileSetGroupEntry indicating that a region covered by tiles in a tile set is rectangular, and potentially based on syntax elements in the TileSetGroupEntry indicating a location and size of the tile set, file parsing unit 31 may determine that the tile set corresponds to a desired region to be output for display. Hence, in this example, file parsing unit 31, as part of processing the tile set, may extract the tiles of the tile set from the file and transmit the extracted tiles. For instance, file parsing unit 31 may extract VCL NAL units of the tiles of the tile set from the file and output the extracted VCL NAL units to a video decoder (e.g., video decoder 30) to be decoded, without outputting the non-extracted VCL NAL units to the video decoder.

As noted above, the TileRegionGroupEntry box, as defined in ISO/IEC 14496-15, includes a horizontal_offset syntax element and a vertical_offset syntax element. The horizontal_offset syntax element and the vertical_offset syntax element indicate an offset of a top-left pixel of a rectangular region represented by a tile region associated with the TileRegionGroupEntry box. The TileRegionGroupEntry box only includes the horizontal_offset syntax element and the vertical_offset syntax element if the tile region associated with the TileRegionGroupEntry box does not correspond to a full picture. Furthermore, the TileRegionGroupEntry box, as defined in ISO/IEC 14496-15, includes a region_width syntax element and a region_height syntax element that indicate the width and height of the rectangular region associated with the TileRegionGroupEntry box.

In accordance with a technique of this disclosure, the syntax and semantics of the offset information (i.e., horizontal and vertical offsets) and width and height of the region covered by the tiles in the tile set (e.g., region_width and region_height) may be modified. For example, the information of horizontal offset, vertical offset, width and height is always signaled. For instance, rather than the horizontal offset and the vertical offset only being signaled when the tile region is not a complete picture, the horizontal offset and the vertical offset are signaled in this example regardless of whether the tile region is or is not a complete picture. In this example, the semantics of the offset syntax elements and the height and width syntax elements may be adjusted such that the semantics of these syntax elements describe a minimum rectangular area that covers all the tiles in the tile set. The minimum rectangular area is the smallest possible rectangular area that encloses all tiles of the tile set.

Thus, in this example, file generation device 34 may include, in a file, regardless of whether a tile region is a complete picture, at least one of: a horizontal offset syntax element (e.g., horizontal_offset) and a vertical offset syntax element (e.g., vertical_offset). In this example, the horizontal offset syntax element specifies a horizontal offset of a top-left pixel of a minimum rectangular region that covers tiles in the tile set. In this example, the vertical offset syntax element specifies a vertical offset of the top-left pixel of the minimum rectangular region that covers tiles in the tile set. Similarly, file parsing unit 31 may obtain, from a file, regardless of whether a tile region is a complete picture, at least one of: a horizontal offset syntax element and a vertical offset syntax element. In this example, the horizontal offset syntax element specifies a horizontal offset of a top-left pixel of a minimum rectangular region that covers tiles in the tile set. The vertical offset syntax element specifies a vertical offset of the top-left pixel of the minimum rectangular region that covers tiles in the tile set. In this example, a sample group description box may include a group description entry comprising the tile set group entry.

Figure 4:
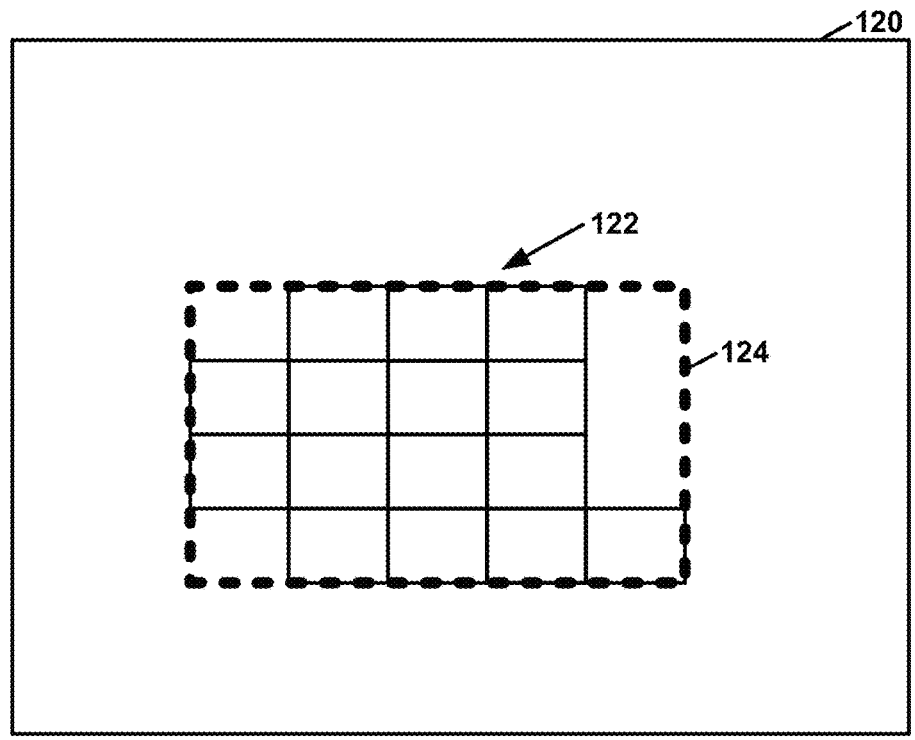
FIG. 4 is a conceptual diagram illustrating an example picture that includes a tile set bounded by a minimum rectangular area that contains a tile set, in accordance with one or more techniques of this disclosure.
Figure 4:
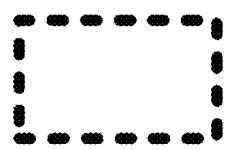
Figure 4:

FIG. 4 is a conceptual diagram illustrating an example picture 120 that includes a tile set 122 bounded by a minimum rectangular area 124 that contains tile set 122, in accordance with one or more techniques of this disclosure. As shown in the example of FIG. 4, tile set 122 includes seventeen tiles arranged in four rows. The first three rows of tiles have four tiles and the bottom row of tiles has five tiles. Hence, tile 122 is not rectangular. Assuming that each tile is 10 units wide and 10 units high, the width syntax element may indicate the value 50 and the height syntax element may indicate the value 40.

In some examples, the information of horizontal offset, vertical offset, width and height is signaled only if the region covered by the tiles in the tile set is of rectangular shape. In this example, the position and size information for a tile set that is not of a rectangular shape may not be available.

In another example, file generation device 34 may include, in a file, only if a region covered by tiles in a tile set is of the rectangular shape, at least one of: a horizontal offset syntax element (e.g., horizontal_offset) and a vertical offset syntax element (e.g., vertical_offset). In this example, the horizontal offset syntax element specifies a horizontal offset of a top-left pixel of a minimum rectangular region that covers tiles in the tile set and the vertical offset syntax element specifies a vertical offset of the top-left pixel of the minimum rectangular region that covers tiles in the tile set. Similarly, file parsing unit 31 may obtain, from a file, only if a region covered by tiles in a tile set is of the rectangular shape, at least one of: a horizontal offset syntax element (e.g., horizontal_offset) and a vertical offset syntax element (e.g., vertical_offset). In this example, the horizontal offset syntax element specifies a horizontal offset of a top-left pixel of a minimum rectangular region that covers tiles in the tile set. The vertical offset syntax element specifies a vertical offset of the top-left pixel of the minimum rectangular region that covers tiles in the tile set. In this example, a sample group description box may include a group description entry comprising the tile set group entry.

As noted above, the TileSetGroupEntry box, as defined in MPEG output document N15297, includes an independent_idc syntax element. However, as described above, the tile dependency signaling for tile regions and tile sets does not work in MPEG output document N15297 when there is inter-layer dependency. Hence, in accordance with an example of this disclosure, to simplify the concepts of tile regions and tile sets, the syntax element independent_idc is changed to a flag (e.g., independent_flag) with the following values: One state of the flag indicates "no temporal dependency." The other state of the flag indicates that "there may or may not be temporal dependency."

Thus, in this example, file generation device 34 may signal a flag (e.g., independent_flag) in a file. In this example, the flag having a first value indicates no temporal dependency, the flag having a different, second value indicates that temporal dependency is allowed. Furthermore, in this example, file parsing unit 31 may obtain the flag from the file and may process the tile set based on the syntax element. For example, when the flag indicates that there is no temporal dependency for a tile set, a video decoder does not need VCL NAL units of another layer to decode VCL NAL units of the tile set. Hence, based on the file indicating that there is no temporal dependency for the tile set, file parsing unit 31 may extract and output the VCL NAL units of the tile set without further determining layers and VCL NAL units on which the VCL NAL units of the tile set depend.

In some examples of this disclosure, to address problems related to mapping of files in sub-samples to tile regions described above, the mapping mechanism for tiles in sub-samples is added into a NALUMapEntry box, instead of into a TileRegionGroupEntry box. For instance, a loop may be added to the NALUMapEntry box to signal a groupID syntax element for each sub-sample in a NAL unit. Thus, in this example, it is possible for the different sub-samples in a NAL unit to be associated with different groupIDs, and it is also possible for all sub-samples in a NAL unit to be associated with the same groupID.

Thus, in this example, file generation device 34 may include, in a NALUMapEntry in a file, for each respective sub-sample in a NAL unit, a respective group identifier syntax element (e.g., groupID). In this example, the respective group identifier syntax element may indicate a tile set entry (e.g., a TileRegionGroupEntry box or TileSetGroupEntry box) corresponding to the respective sub-sample. Similarly, file parsing unit 31 may obtain, from a NALU-MapEntry in the file, for each respective sub-sample in a NAL unit, a respective group identifier syntax element (e.g., groupID). The respective group identifier syntax element may indicate a tile set entry (e.g., a TileRegionGroupEntry box or TileSetGroupEntry box) corresponding to the respective sub-sample. The tile set entry corresponds to a tile set. File parsing unit 31 may process the tile set. For example, in FIG. 2, a VCL NAL unit for slice segment 94 includes encoded CTUs of tile 82, tile 84, and some encoded CTUs of tile 86. In this example, a NALUMapEntry in the file may include, for the VCL NAL unit, a respective group identifier for each of tiles 82, 84, and 86. Thus, if the desired output is tiles 82 and 84, file parsing unit 31 may determine, based on the groupID syntax elements signaled in the NALUMapEntry, that the VCL NAL unit includes encoded CTUs for tile 82 and tile 84. Accordingly, in this example, file parsing unit 31 may extract the VCL NAL unit from the file. File parsing unit 31 may output the extracted VCL NAL unit to a video decoder, such as video decoder 30 (FIG. 1), for decoding.

Furthermore, in ISO/IEC 14496-15, the NALUMapEntry box includes an rle syntax element and a NALU_start_number syntax element. In some examples, the run length encoding mechanism in NALUMapEntry, implemented by the syntax elements rle and NALU_start_number, is removed for simplification and for making it consistent with ScalableNALUMapEntry and Sub SampleInformationBox.

In accordance with an example of this disclosure to address problems described above with respect to mapping of tiles in sub-samples to tile regions, in TileRegionGroupEntry, a mechanism is specified to indicate that more than one subsample (i.e., tile) in a NAL unit may be mapped to a tile set. In some examples, this can be done by either having a loop of subsample_id syntax elements (similar to the above-mentioned loop added into the NALUMapEntry). In other examples, indicating that more than one subsample in a NAL unit is mapped to a tile set may be accomplished by other means, such as having 32 bits, for which each bit represents one tile within a NAL unit, where a bit set to 1 means that a corresponding tile is part of the tile set, while the bit set to 0 means that the corresponding tile is not part of the tile set. For instance, the value 0100 0001 0000 0000 0000 0000 0000 0001 may indicate that the second, eighth, and $32^{nd}$ tiles in a NAL unit are in a tile set.

Thus, in this example, file generation device 34 may include, in a visual sample group entry (e.g., a TileRegionGroupEntry box or a TileSetGroupEntry box) in a file, for each respective sub-sample in a NAL unit, a sub-sample identifier syntax element (e.g., subsample_id) having a plurality of bits. In this example, the plurality of bits includes bits corresponding to different tiles within the NAL unit. Furthermore, in this example, a bit corresponding to a tile in the NAL unit indicates whether the tile is part of a tile set. Similarly, file parsing unit 31 may obtain, from a visual sample group entry in the file, for each respective sub-sample in a NAL unit, a sub-sample identifier syntax element (e.g., subsample_id) having a plurality of bits. The plurality of bits includes bits corresponding to different tiles within the NAL unit and a bit corresponding to a tile in the NAL unit indicates whether the tile is part of a tile set. File parsing unit 31 may process the tile set. For example, in FIG. 2, a VCL NAL unit for slice segment 94 includes encoded CTUs of tile 82, tile 84, and some encoded CTUs of tile 86. In this example, a NALUMapEntry in the file may include, for the VCL NAL unit, a syntax element equal to 1100 0000 0000 0000 0000 0000 0000 0000, to indicate that the first two tiles in the VCL NAL unit (i.e., tile 82 and tile 84) are included in the tile set. Thus, if the desired output is tiles 82 and 84, file parsing unit 31 may determine, based on the groupID syntax elements signaled in the NALUMapEntry, that the VCL NAL unit includes encoded CTUs for tile 82 and tile 84. Accordingly, in this example, file parsing unit 31 may extract the VCL NAL unit from the file. File parsing unit 31 may output the extracted VCL NAL unit to a video decoder, such as video decoder 30 (FIG. 1), for decoding.

Techniques of this disclosure may address problems described above with respect to tile region and tile set inter-layer dependency. For instance, in one example, a tile set has a layer-specific scope, i.e., each layer has its own tile set signaling. In other words, in this example, all tiles that are part of a tile set must belong to pictures from the same layer. Hence, each tile that is part of a tile set belongs to pictures of the same layer. For example, a bitstream may have two layers: Layer 0 and Layer 1. In this example, a first TileSetGroupEntry may be signaled for Layer 0 and a second TileSetGroupEntry may be signaled for Layer 1. In this example, the first TileSetGroupEntry does not refer to tiles in Layer 1 and the second TileSetGroupEntry does not refer to tiles in Layer 0.

Furthermore, in some examples, a new syntax element indicating the layer ID of the layer to which the tile set belongs is additionally signaled in a tile set description entry (e.g., TileSetGroupEntry, a TileRegionGroupEntry box). Thus, in this example, file generation device 34 may signal, in a tile set description entry of a file, a syntax element (e.g., layerID) indicating a layer identifier of a layer to which a tile set belongs. For example, a bitstream may include a layer 0 and a layer 1. In this example, the syntax element may indicate a layer identifier of layer 0 to indicate that the tile set belongs to layer 0. Similarly, file parsing unit 31 may obtain, from a tile set description entry of the file, a syntax element indicating a layer identifier of a layer to which a tile set belongs. In this example, file parsing unit 31 may process, based on the syntax element, the tile set. For example, file parsing unit 31 may use the syntax element to determine that a tile set description entry corresponds to a particular layer as part of determining which VCL NAL units include encoded blocks (e.g., CTUs) of a desired tile set. In this example, if the layer identifier indicated by the syntax element indicates the particular layer, file parsing unit 31 may use information in the tile set description entry to determine whether the tile set description entry corresponds to a desired tile group. Furthermore, if the tile set description entry corresponds to the desired tile group, file parsing unit 31 may extract VCL NAL units assigned to the groupID specified by the tile set description entry.

Figure 5:
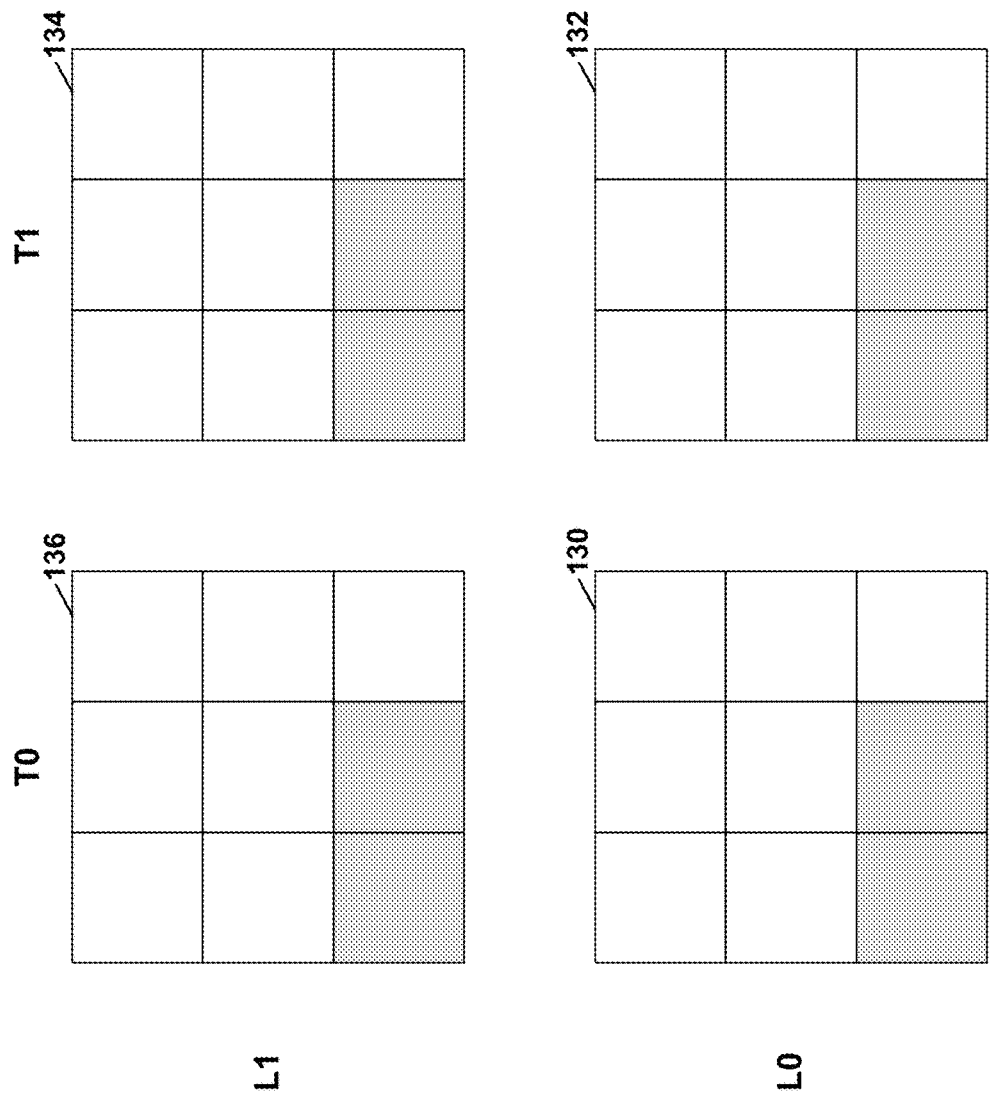
FIG. 5 is a conceptual diagram illustrating tile sets that cover the same region in different layers.

In some examples, tile sets that cover the same region in different layers (i.e., collocated regions) have the same tile set ID. For instance, FIG. 5 is a conceptual diagram illustrating tile sets that cover the same region in different layers. In the example of FIG. 5, pictures 130, 132 are in a first layer (L0) and pictures 134, 136 are in a second layer (L1). Furthermore, in the example of FIG. 5, pictures 130, 136 are in a first access unit (T0) and pictures 132, 134 are in a second access unit (T1). Each of pictures 130, 132, 134, 136 includes nine tiles indicated by smaller squares. As mentioned above, in accordance with an example of this disclosure, there is a TileSetGroupEntry box for each layer (e.g., a TileSetGroupEntry box for L0 and a separate TileSetGroupEntry box for L1). Tiles in a tile set for L0 and tiles in a tile set for L1 are shaded. Since, in the example of FIG. 5, the tiles in the tile set for L0 are collocated with the tiles in the tile set for L1, the tile set ID for the tile set for L0 is the same as the tile set ID for the tile set for L1.

Additionally, in this example, file generation device 34 may signal or otherwise include, in the tile set group entry of the file, dependency information (e.g., dependency_list, dependency_tile_count, dependencyTileGroupID) describing dependency with a layer to which a tile set belongs. Additionally, in this example, file parsing unit 31 may obtain, from the tile set group entry of the file, dependency information describing dependency with a layer to which a tile set belongs. In this example, file parsing unit 31 may process, based on the syntax element and the dependency information, the tile set. For example, file parsing unit 31 may use the dependency information in a current tile set group entry to identify tile set group entries that have syntax elements (e.g., layerID syntax elements) that correspond to the dependent layers (i.e., the layers on which the layer to which the tile set belongs depends) and that have syntax elements (e.g., groupID syntax elements) that specify the same value as the groupID of the current tile set group entry. In this example, file parsing unit 31 may then identify VCL NAL units that contain encoded blocks of tile groups in each of the dependent layers.

Furthermore, as defined in MPEG output document N15297, the independent_idc syntax element in the TileRegionGroupEntry box specifies the coding dependencies between a tile region and other tile regions in the current picture and in reference pictures of the same layer. In accordance with an example of this disclosure, for the TileSetGroupEntry box, dependency information (e.g., based on a syntax element independent_idc) describes dependency within the layer to which the tile set belongs. In other words, a TileSetGroupEntry box may include one or more syntax elements indicating dependency information.

In some examples, for inter-layer dependency information, layer dependency signaled in 'oinf' and 'linf' sample group are used. For instance, an 'oinf' sample group description box for an operation point may include syntax elements that indicate, for each respective layer of the operation point, which, if any, other layers of the operation point are reference layers of the respective layer. A 'linf' sample group description box for a layer may include syntax elements that indicate reference layers of the layer. Thus, in this example, rather than indicating the layer dependency in a tile set group entry (e.g., using a dependency_list syntax element, dependency_tile_count syntax element, and dependencyTile- GroupID syntax elements, as described above), file parsing unit 31 may instead use 'oinf' and/or 'linf' sample groups to determine the layer dependencies.

In some example techniques of this disclosure to address the problems described above with respect to tile region and tile set inter-layer dependency, a tile region is not merged into tile set. In other words, the separate concepts of tile regions and tile sets are maintained. In such examples, the following may apply:

a. A tile region is specified as layer specific.
b. A syntax element indicating a layer ID of a layer to which the tile region belongs is additionally signaled in a tile region description entry (i.e., TileRegionGroupEntry).
c. Tile regions that cover the same region in different layers (i.e., collocated region) may have the same tile region ID.
d. For TileRegionGroupEntry, dependency information (e.g., based on current syntax element independent_idc) describes dependency within the layer to which the tile region belongs.
e. For inter-layer dependency information, layer dependency signaled in 'oinf' and 'linf' sample group are used.

Thus, in this example, file generation device 34 may signal, in a tile region group entry (e.g., a TileRegionGroupEntry box) in a file, a syntax element (e.g., layerID) indicating a layer identifier of a layer to which a tile region belongs. Additionally, in this example, file generation device 34 may signal, in the tile region group entry of a file, dependency information (e.g., based on the independent_idc syntax element) describing dependency with a layer to which the tile region belongs. Likewise, file parsing unit 31 may obtain, from a tile region description entry (e.g., a TileRegionGroupEntry box) in the file, a syntax element (e.g., layer ID) indicating a layer identifier of a layer to which a tile region belongs. Additionally, in this example, file parsing unit 31 may obtain, from the tile region group entry of the file, dependency information describing dependency with a layer to which the tile region belongs. File parsing unit 31 may process, based on the syntax element and the dependency information, the tile set. File parsing unit 31 may process the tile set in accordance with corresponding examples elsewhere in this disclosure.

In accordance with some examples of this disclosure, the definition of a "tile set" is changed such that a "tile set" means a set of one or more complete HEVC tiles that are decodable without the presence of other tiles that are not part of the set and the tiles may, but need not, be contiguous in decoding order. In other words, the set of tiles that are part of a tile set is motion constrained within the tile set (not necessarily within each tile itself) such that the tiles are coded without reference to tiles that are not part of the tile set. For example, a video coder can only use block in a tile in a reference picture that is temporally collocated with the tile for motion prediction. With this definition, existing information, such as random access group box, sync group box or NAL unit header information, can be used to infer temporal dependency for a tile set. Thus, in this example, it is not necessary to signal such information in TileSetGroupEntry. For instance, it may not be necessary to signal a dependency_list syntax element, a dependency_tile_count syntax element, or dependencyTileGroupID syntax elements in a TileSetGroupEntry.

In accordance with a technique of this disclosure, to address the problems described above regarding picture-level and upper-level non-VCL NAL units, it is proposed to have a special groupID value, in addition to the groupID 0, to indicate NAL units that are associated with all tile regions or tile sets. For example, if a NALUMapEntry box assigns a groupID equal to 0 to a NAL unit, the NAL unit is not associated with any group. In this example, if the NALUMapEntry box assigns a groupID equal to 1 to a NAL unit, the NAL unit is a non-VCL NAL unit and the NAL unit may be needed for processing any group assigned a groupID greater than 1. In other examples, NAL units assigned groupIDs with values other than 1 may be needed for processing other groups.

Thus, in this example, file generation device 34 may include, in a NALUMapEntry of the file, a group identifier syntax element (e.g., groupID). In this example, the group identifier syntax element having a value equal to 0 indicates a NAL unit or sub-sample is not associated with any group, and the group identifier syntax element having a value equal to 1 indicates the NAL unit is a non-VCL NAL unit that may be needed for processing any group with a group identifier syntax element greater than 1, and the group identifier syntax element having a value greater than 1 indicates a corresponding tile set group set entry. Similarly, file parsing unit 31 may obtain, from a NALUMapEntry of the file, a group identifier syntax element (e.g., groupID). The group identifier syntax element having a value equal to 0 indicates a NAL unit or sub-sample is not associated with any group, the group identifier syntax element having a value equal to 1 indicates the NAL unit is a non-VCL NAL unit that may be needed for processing any group with a group identifier syntax element greater than 1, and the group identifier syntax element having a value greater than 1 indicates a corresponding tile set group set entry. In this example, file parsing unit 31 may process the tile set. For example, file parsing unit 31 may use a NALUMapEntry to identify NAL units that are assigned group identifiers equal to 1 along with NAL units that are assigned a group identifier associated with a desired tile set. Furthermore, in this example, file parsing unit 31 may extract the identified NAL units from the file and output the extracted NAL units (e.g., to a video decoder, such as video decoder 30 (FIG. 1)).

In various examples, a device, such as a MANE, may process (e.g., based on various syntax elements) a tile set. Such processing may comprise various actions, such as extracting the tiles from the file. Furthermore, such processing may comprise transmitting the extracted tiles (e.g., to a video decoder, destination device 14, etc.). For instance, it may be desired to only transmit a tile set of a picture, but not transmit remaining tiles of the picture. This may be desirable for error correction, in cases where only a portion of the picture corresponding to the tile set contains updated content, or in other situations.

Figure 6:
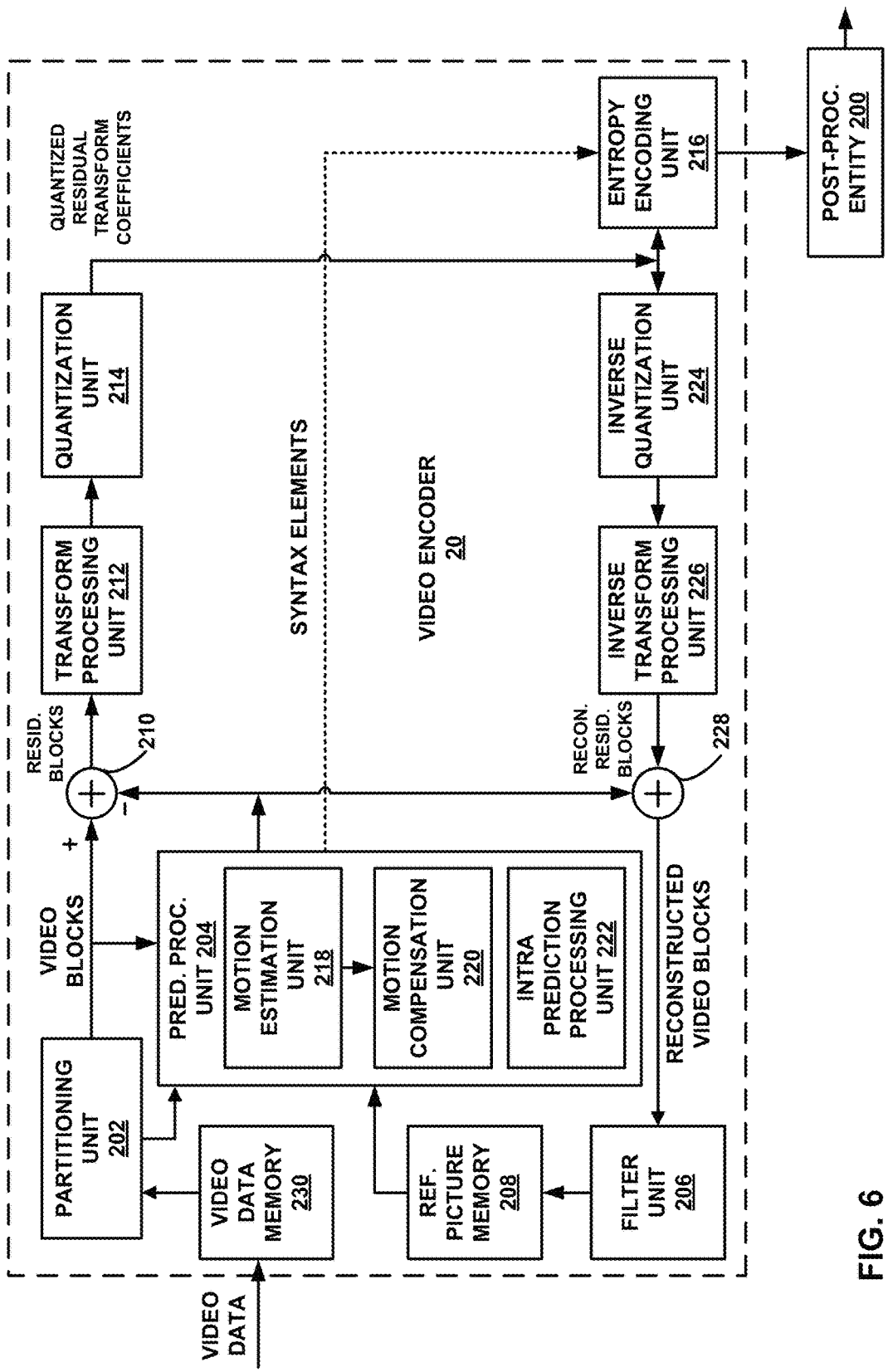
FIG. 6 is a block diagram illustrating an example video encoder that may implement the techniques described in this disclosure.

FIG. 6 is a block diagram illustrating an example video encoder 20 that may implement the techniques described in this disclosure. Video encoder 20 represents an example of a video coder configured to generate video data that may be stored using the file format techniques described in this disclosure. Video encoder 20 may be configured to output single view, multiview, scalable, 3D, and other types of video data. Video encoder 20 may be configured to output encoded video data to post-processing entity 200. Post-processing entity 200 is intended to represent an example of a video entity, such as a MANE or splicing/editing device, that may process encoded video data from video encoder 20. In some instances, post-processing entity 200 may be an example of a network entity. In some video encoding systems, post-processing entity 200 and video encoder 20 may be parts of separate devices, while in other instances, the functionality described with respect to post-processing entity 200 may be performed by the same device that comprises video encoder 20. Post-processing entity 200 may be a video device. In some examples, post-processing entity 200 may be the same as file generation device 34 of FIG. 1.

In accordance with a technique of this disclosure, post-processing entity 200 may generate a file for storage of encoded video content generated by video encoder 20. Post-processing entity 200 may generate the file in accordance with any of the techniques of this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes a partitioning unit 202, prediction processing unit 204, filter unit 206, reference picture memory 208, summer 210, transform processing unit 212, quantization unit 214, and entropy encoding unit 216. Prediction processing unit 204 includes motion estimation unit 218, motion compensation unit 220, and intra prediction processing unit 222. For video block reconstruction, video encoder 20 also includes inverse quantization unit 224, inverse transform processing unit 226, and summer 228. Filter unit 206 is intended to represent one or more loop filters such as a deblocking filter, an adaptive loop filter (ALF), and/or a sample adaptive offset (SAO) filter. Although filter unit 206 is shown in FIG. 6 as being an in-loop filter, in other configurations, filter unit 206 may be implemented as a post loop filter.

A video data memory 230 of video encoder 20 may store video data to be encoded by the components of video encoder 20. The video data stored in video data memory 230 may be obtained, for example, from video source 18. Reference picture memory 208 may be a reference picture memory that stores reference video data for use in encoding video data by video encoder 20, e.g., in intra- or inter-coding modes. Video data memory 230 and reference picture memory 208 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and reference picture memory 208 may be provided by the same memory device or separate memory devices. In various examples, video data memory 230 may be on-chip with other components of video encoder 20, or off-chip relative to those components.

As shown in FIG. 6, video encoder 20 receives video data, and partitioning unit 202 partitions the data into video blocks. This partitioning may also include partitioning into slices, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks. Prediction processing unit 204 may select one of a plurality of possible coding modes, such as one of a plurality of intra coding modes or one of a plurality of inter coding modes, for the current video block based on error results (e.g., coding rate and the level of distortion). Prediction processing unit 204 may provide the resulting intra- or inter-coded block to summer 210 to generate residual block data and to summer 228 to reconstruct the encoded block for use as a reference picture.

Intra prediction processing unit 222 within prediction processing unit 204 may perform intra-predictive coding of the current video block relative to one or more neighboring blocks in the same frame or slice as the current block to be coded to provide spatial compression. Motion estimation unit 218 and motion compensation unit 220 within prediction processing unit 204 perform inter-predictive coding of the current video block relative to one or more predictive blocks in one or more reference pictures to provide temporal compression.

Motion estimation unit 218 may be configured to determine the inter-prediction mode for a video slice according to a predetermined pattern for a video sequence. The predetermined pattern may designate video slices in the sequence as P slices, B slices, or GPB slices. Motion estimation unit 218 and motion compensation unit 220 may be highly integrated, but are illustrated separately for conceptual purposes. Motion estimation, performed by motion estimation unit 218, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 208. For example, video encoder 20 may interpolate values of one-quarter pixel positions, one-eighth pixel positions, or other fractional pixel positions of the reference picture. Therefore, motion estimation unit 218 may perform a motion search relative to the full pixel positions and fractional pixel positions and output a motion vector with fractional pixel precision.

Motion estimation unit 218 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 208. Motion estimation unit 218 sends syntax elements from which the calculated motion vector can be determined to entropy encoding unit 216 and motion compensation unit 220.

Motion compensation, performed by motion compensation unit 220, may involve fetching or generating the predictive block based on the motion vector determined by motion estimation, possibly performing interpolations to sub-pixel precision. Upon receiving the motion vector for the PU of the current video block, motion compensation unit 220 may locate the predictive block to which the motion vector points in one of the reference picture lists. Video encoder 20 may form a residual video block by subtracting pixel values of the predictive block from the pixel values of the current video block being coded, forming pixel difference values. The pixel difference values form residual data for the block, and may include both luma and chroma difference components. Summer 210 represents the component or components that perform this subtraction operation.

Motion compensation unit 220 may also generate syntax elements associated with the video blocks and the video slice for use by video decoder 30 in decoding the video blocks of the video slice.

Intra prediction processing unit 222 may intra-predict a current block, as an alternative to the inter-prediction performed by motion estimation unit 218 and motion compensation unit 220, as described above. For example, intra prediction processing unit 222 may determine an intra-prediction mode to use to encode a current block. In some examples, intra prediction processing unit 222 may encode a current block using various intra-prediction modes, e.g., during separate encoding passes, and intra prediction processing unit 222 may select an appropriate intra-prediction mode to use from the tested modes. For example, intra prediction processing unit 222 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 222 may calculate ratios from the distortions and rates for the various encoded blocks to determine which intra-prediction mode exhibits the best rate-distortion value for the block.

In any case, after selecting an intra-prediction mode for a block, intra prediction processing unit 222 may provide information indicative of the selected intra-prediction mode for the block to entropy encoding unit 216. Entropy encoding unit 216 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 204 generates the predictive block for the current video block via either inter-prediction or intra-prediction, video encoder 20 may form a residual video block by subtracting the predictive block from the current video block. The residual video data in the residual block may be included in one or more TUs and applied to transform processing unit 212. Transform processing unit 212 transforms the residual video data into residual transform coefficients using a transform, such as a discrete cosine transform (DCT) or a conceptually similar transform. Transform processing unit 212 may convert the residual video data from a pixel domain to a transform domain, such as a frequency domain.

Transform processing unit 212 may send the resulting transform coefficients to quantization unit 214. Quantization unit 214 quantizes the transform coefficients to further reduce bit rate. The quantization process may reduce the bit depth associated with some or all of the coefficients. The degree of quantization may be modified by adjusting a quantization parameter. In some examples, quantization unit 214 may then perform a scan of the matrix including the quantized transform coefficients. Alternatively, entropy encoding unit 216 may perform the scan.

Following quantization, entropy encoding unit 216 may entropy encode syntax elements representing the quantized transform coefficients. For example, entropy encoding unit 216 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 216, the encoded bitstream may be transmitted to video decoder 30, or archived for later transmission or retrieval by video decoder 30. Entropy encoding unit 216 may also entropy encode the motion vectors and the other syntax elements for the current video slice being coded.

Inverse quantization unit 224 and inverse transform processing unit 226 apply inverse quantization and inverse transformation, respectively, to reconstruct the residual block in the pixel domain for later use as a reference block of a reference picture. Motion compensation unit 220 may calculate a reference block by adding the residual block to a predictive block of one of the reference pictures within one of the reference picture lists. Motion compensation unit 220 may also apply one or more interpolation filters to the reconstructed residual block to calculate sub-integer pixel values for use in motion estimation. Summer 228 may add the reconstructed residual block to the motion compensated prediction block produced by motion compensation unit 220 to produce a reference block for storage in reference picture memory 208. The reference block may be used by motion estimation unit 218 and motion compensation unit 220 as a reference block to inter-predict a block in a subsequent video frame or picture.

In some examples, post-processing entity 200 generates a file for storage of video contents, such as the bitstream generated by video encoder 20. For example, post-processing entity 200 may receive a bitstream that includes a sequence of bits that forms a representation of encoded pictures of the video data. In this example, the pictures of the video data include a current picture, the current picture is partitioned into a plurality of tiles, and each respective tile of the plurality of tiles is a respective rectangular region. Furthermore, in this example, post-processing entity 200 may generate a NAL Unit Map Entry box (e.g., NALUMapEntry) in a file. The NAL Unit Map Entry box associates NAL units of the bitstream with a tile set. In this example, the tile set may include two or more tiles of the plurality of tiles into which the current picture is partitioned. In some instances, a region of the current picture covered by the tiles in the tile set is not rectangular in shape. Furthermore, in this example, post-processing entity 200 generates a tile set group entry in the file. The tile set group entry includes a group identifier syntax element that identifies the tile set. Additionally, in this example, the tile set entry box includes a horizontal offset syntax element, a vertical offset syntax element, a width syntax element, and a height syntax element. The horizontal offset syntax element specifies a horizontal offset of a top-left pixel of a minimum rectangular region that covers tiles in the tile set. The vertical offset syntax element specifies a vertical offset of the top-left pixel of the minimum rectangular region that covers tiles in the tile set. The width syntax element specifies a width of the minimum rectangular region that covers the tiles in the tile set. The height syntax element specifies a height of the minimum rectangular region that covers the tiles in the tile set.

Figure 7:
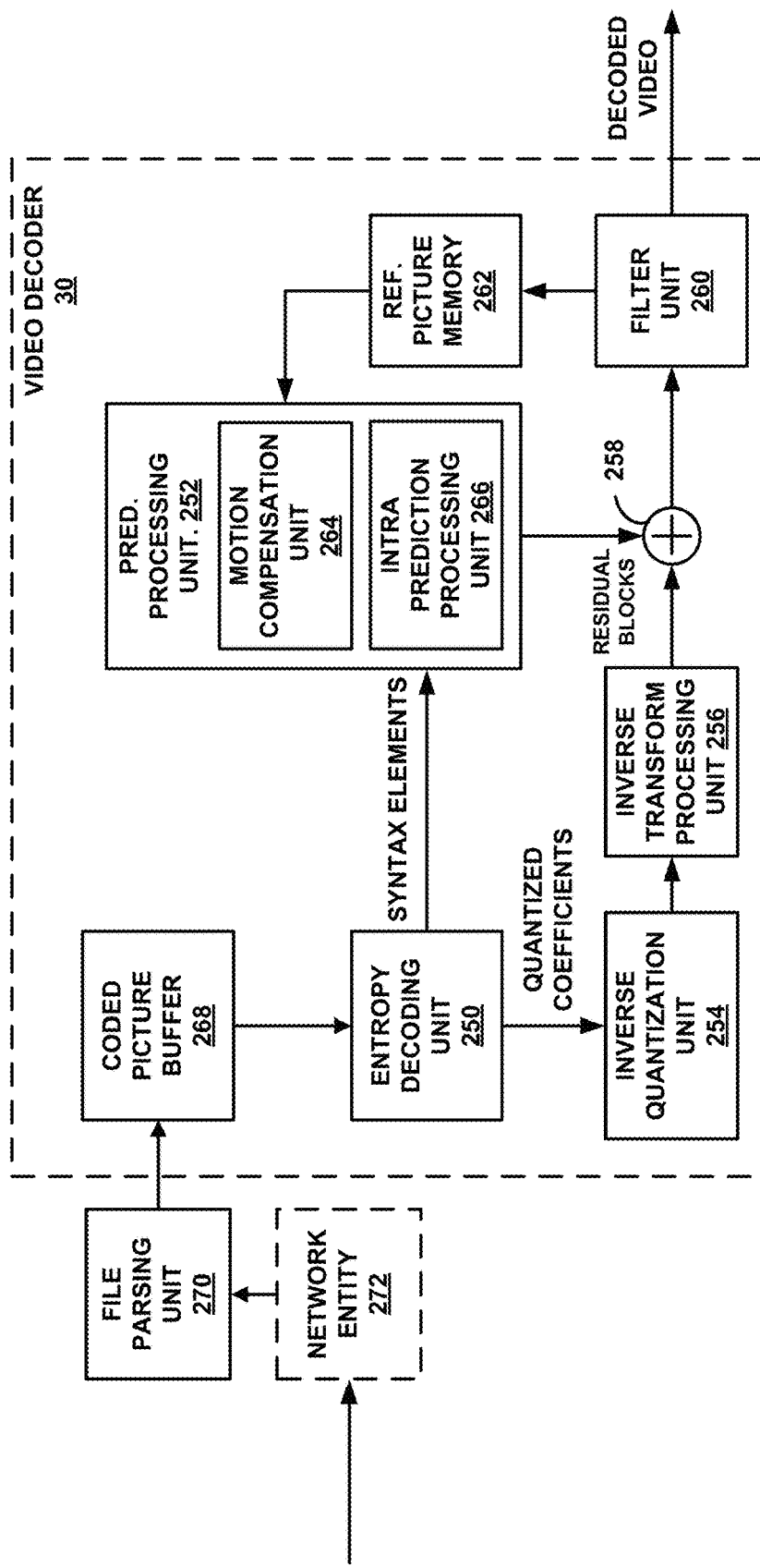
FIG. 7 is a block diagram illustrating an example video decoder that may implement the techniques described in this disclosure.

FIG. 7 is a block diagram illustrating an example video decoder 30 that may implement the techniques described in this disclosure. Video decoder 30 of FIG. 7 represents an example of a video decoder configured to decode video data that may be stored using the file format techniques described in this disclosure.

Video decoder 30 may be configured to decode single view, multiview, scalable, 3D, and other types of video data. In the example of FIG. 7, video decoder 30 includes an entropy decoding unit 250, prediction processing unit 252, inverse quantization unit 254, inverse transform processing unit 256, summer 258, filter unit 260, and reference picture memory 262. Prediction processing unit 252 includes motion compensation unit 264 and intra prediction processing unit 266. Video decoder 30 may, in some examples, perform a decoding pass generally reciprocal to the encoding pass described with respect to video encoder 20 from FIG. 6.

A coded picture buffer (CPB) 268 may receive and store encoded video data (e.g., NAL units) of a bitstream. The video data stored in CPB 268 may be obtained, for example, from link 16 of FIG. 1, e.g., from a local video source, such as a camera, via wired or wireless network communication of video data, or by accessing physical data storage media. CPB 268 may form a video data memory that stores encoded video data from an encoded video bitstream. Reference picture memory 262 may be a reference picture memory that stores reference video data for use in decoding video data by video decoder 30, e.g., in intra- or inter-coding modes. CPB 268 and reference picture memory 262 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 268 and reference picture memory 262 may be provided by the same memory device or separate memory devices. In various examples, CPB 268 may be on-chip with other components of video decoder 30, or off-chip relative to those components.

During the decoding process, video decoder 30 receives an encoded video bitstream that represents video blocks of an encoded video slice and associated syntax elements from video encoder 20. In the example of FIG. 7, video decoder 30 may receive the encoded video bitstream from a file parsing unit 270 that parses a file to extract a coded video bitstream. In some examples, file parsing unit 270 may receive the file from a network entity 272. Network entity 272 may, for example, be a server, a MANE, a video editor/splicer, or other such device configured to implement one or more of the techniques described above. Network entity 272 may or may not include a video encoder, such as video encoder 20. Some of the techniques described in this disclosure may be implemented by network entity 272 prior to network entity 272 transmitting the encoded video bitstream to video decoder 30. In some video decoding systems, network entity 272 and video decoder 30 may be parts of separate devices, while in other instances, the functionality described with respect to network entity 272 may be performed by the same device that comprises video decoder 30. Network entity 272 may be considered to be a video device. Furthermore, in some examples, network entity 272 is the file generation device 34 of FIG. 1. File parsing unit 270 may be implemented as part of destination device 14 or a device separate from destination device. In some examples, network entity 272 and file parsing unit 270 are implemented by the same device.

In the example of FIG. 7, file parsing unit 270 may obtain a NAL Unit Map Entry box in a file. In this example, the NAL Unit Map Entry box associates NAL units of a bitstream with a tile set. The bitstream includes a sequence of bits that forms a representation of encoded pictures of the video data. In this example, the pictures of the video data include a current picture, the current picture is partitioned into a plurality of tiles, and each respective tile of the plurality of tiles is a respective rectangular region. Furthermore, in this example, the tile set includes two or more tiles of the plurality of tiles into which the current picture is partitioned. In some instances, a region of the current picture covered by the tiles in the tile set may not be rectangular in shape. In this example, file parsing unit 270 may obtain a tile set group entry (e.g., TileSetGroupEntry, TileRegionGroupEntry) in the file. The tile set group entry includes a group identifier syntax element that identifies the tile set. Additionally, the tile set group entry includes a horizontal offset syntax element, a vertical offset syntax element, a width syntax element, and a height syntax element. The horizontal offset syntax element specifies a horizontal offset of a top-left pixel of a minimum rectangular region that covers tiles in the tile set. The vertical offset syntax element specifies a vertical offset of the top-left pixel of the minimum rectangular region that covers tiles in the tile set. The width syntax element specifies a width of the minimum rectangular region that covers the tiles in the tile set. The height syntax element specifies a height of the minimum rectangular region that covers the tiles in the tile set. Furthermore, in this example, file parsing unit 270 may process the tile set based on the horizontal offset syntax element, the vertical offset syntax element, the width syntax element, and the height syntax element. For example, file parsing unit 270 may use the horizontal offset syntax element, the vertical offset syntax element, the width syntax element, and the height syntax element to determine whether a tile set corresponding to the tile set group entry is a desired tile set. Furthermore, in this example, if the tile set corresponding to the tile set group entry is the desired tile set, file parsing unit 270 may use the NAL Unit Map Entry box to identify NAL units of the bitstream that are associated with the desired tile set. File parsing unit 270 may forward the identified NAL units to video decoder 30 for decoding. The desired tile set may be specified by a source outside file parsing unit 270, file parsing unit 270 may determine the desired tile set based on data from a device decoding the video data (e.g., destination device 14), file parsing unit 270 may determine the desired tile set based on other factors, such as bandwidth, and/or file parsing unit 270 may determine the desired tile set on other ways.

Entropy decoding unit 250 of video decoder 30 entropy decodes particular syntax elements of the bitstream to generate quantized coefficients, motion vectors, and other syntax elements. Entropy decoding unit 250 forwards the motion vectors and other syntax elements to prediction processing unit 252. Video decoder 30 may receive the syntax elements at the video slice level and/or the video block level.

When the video slice is coded as an intra-coded (I) slice, intra prediction processing unit 266 of prediction processing unit 252 may generate prediction data for a video block of the current video slice based on a signaled intra prediction mode and data from previously decoded blocks of the current frame or picture. When the video frame is coded as an inter-coded (i.e., B or P) slice, motion compensation unit 264 of prediction processing unit 252 produces predictive blocks for a video block of the current video slice based on the motion vectors and other syntax elements received from entropy decoding unit 250. The predictive blocks may be produced from one of the reference pictures within one of the reference picture lists. Video decoder 30 may construct the reference frame lists, List 0 and List 1, using default construction techniques based on reference pictures stored in reference picture memory 262.

Motion compensation unit 264 determines prediction information for a video block of the current video slice by determining the motion vectors and obtaining other syntax elements, and uses the prediction information to produce the predictive blocks for the current video block being decoded. For example, motion compensation unit 264 uses some of the received syntax elements to determine a prediction mode (e.g., intra- or inter-prediction) used to code the video blocks of the video slice, an inter-prediction slice type (e.g., B slice, or P slice) in the case of inter prediction, construction information for one or more of the reference picture lists for the slice, motion vectors for each inter-encoded video block of the slice, inter-prediction status for each inter-coded video block of the slice, and/or other information to decode the video blocks in the current video slice.

Motion compensation unit 264 may also perform interpolation based on interpolation filters. Motion compensation unit 264 may use interpolation filters as used by video encoder 20 during encoding of the video blocks to calculate interpolated values for sub-integer pixels of reference blocks. In this case, motion compensation unit 264 may determine the interpolation filters used by video encoder 20 from the received syntax elements and may use the interpolation filters to produce predictive blocks.

Inverse quantization unit 254 inverse quantizes, i.e., de-quantizes, the quantized transform coefficients provided in the bitstream and decoded by entropy decoding unit 250. The inverse quantization process may include use of a quantization parameter calculated by video encoder 20 for each video block in the video slice to determine a degree of quantization and, likewise, a degree of inverse quantization that should be applied. Inverse transform processing unit 256 applies an inverse transform, e.g., an inverse DCT, an inverse integer transform, or a conceptually similar inverse transform process, to the transform coefficients in order to produce residual blocks in the pixel domain.

After motion compensation unit 264 generates the predictive block for the current video block based on the motion vectors and other syntax elements, video decoder 30 forms a decoded video block by summing the residual blocks from inverse transform processing unit 256 with the corresponding predictive blocks generated by motion compensation unit 264. Summer 258 represents the component or components that perform this summation operation. If desired, loop filters (either in the coding loop or after the coding loop) may also be used to smooth pixel transitions, or otherwise improve the video quality. Filter unit 260 is intended to represent one or more loop filters such as a deblocking filter, an adaptive loop filter (ALF), and/or a sample adaptive offset (SAO) filter. Although filter unit 260 is shown in FIG. 7 as being an in-loop filter, in other configurations, filter unit 260 may be implemented as a post loop filter. The decoded video blocks in a given frame or picture are then stored in reference picture memory 262, which stores reference pictures used for subsequent motion compensation. Reference picture memory 262 also stores decoded video data for later presentation on a display device, such as display device 32 of FIG. 1. Thus, reference picture memory 262 may be an example of one or more data storage media configured to store video data.

A discussion of example details of techniques of this disclosure described elsewhere in this disclosure is provided in this section. As noted above, text between "<insert>" and "</insert> symbols corresponds to additions or modified existing texts (e.g., <insert>added text</insert>), while removed text is between "<delete>" and "</delete> symbols (e.g., <delete>deleted text</delete>).

As indicated above, in accordance with an example of this disclosure, it is proposed to merge the tile region concept into the tile set concept. The following text describes implementation details of this example. Particularly, the syntax and semantics of the TileSetGroupEntry box after merging with the TileRegionGroupEntry box may be defined as follows:

```
class TileSetGroupEntry( ) extends VisualSampleGroupEntry
('tsif') {
    unsigned int(16) groupID;
    <insert>unsigned int(6) layerID;
    int (2) reserved;
    unsigned int(1)     rectangular_flag;
    unsigned int(2)     independent_idc;
    unsigned int(1)     filtering_disabled;
    int (3) reserved;
    unsigned int(16)    horizontal_offset;
    unsigned int(16)    vertical_offset;
    unsigned int(16)    region_width;
    unsigned int(16)    region_height;</insert>
    <delete>int(2) dependency_list;
    int (5) reserved;
    if ((dependency_list==1) || (dependency_list==3)) {
        unsigned int(16) dependency_tile_count;
        for (i=1; i<= dependency_tile_count; i++){
            unsigned int(16) dependencyTileGroupID;
        }
    if (dependency_list==3) {
        unsigned int(16) irap_dependency_tile_count;
        for (i=1; i<= irap_dependency_tile_count; i++){
            unsigned int(16) irap_dependencyTileGroupID;
        }
    } else if (dependency_list==2) {
        unsigned int(16) topLeftDependencyTileGroupId;
        unsigned int(16) bottomRightDependencyTileGroupId;
    }</delete>
}
``` groupID is the identifier for the tile set. Value 0 is reserved for special use in the 'nalm' box.

<insert>layerID is the identifier of the layer to which the tile set unit belongs to.

rectangular_flag indicates whether the area covered by the tiles in the tile set is of a rectangular shape.

independent_idc specifies the coding dependencies between this tile set and other tile sets in the current picture and in the reference pictures of the same layer. Inter-layer dependencies, if any, are indicated by 'linf' and/or 'oinf' sample group. A tile set with groupID gidA and layerID lidA has inter-layer dependency to another tile set with groupID gidB and layerID lidB if gidA is equal gidB and lidB is a reference layer of lidA as indicated by 'linf' and/or 'oinf' sample group. The value of independent_idc is as follows:

If independent_idc equals 0, the coding dependencies between this tile set and other tiles in the same picture or previous pictures is unknown.

If independent_idc equals 1, there are no temporal dependency between this tile set and the other tile sets with different groupID in any reference pictures but there can be temporal coding dependency between tiles from different pictures within the same tile set.

If independent_idc equals 2, there are no temporal dependency between tiles in this tile set and any other tiles in the reference pictures.

Value 3 is reserved.</insert>
filtering_disabled, when set, indicates that no post-decoding filtering operation on this tile region require access to pixels adjacent to this tile region, i.e. bit-exact reconstruction of the tile region is possible without decoding the adjacent tiles.
<insert>horizontal_offset specifies the horizontal offset of the top-left pixel of the minimum rectangular region that covers the tiles in the tile set, relative to the top-left pixel of the picture, in luma samples of the base region (which is the whole picture).
vertical_offset specifies the vertical offset of the top-left pixel of the minimum rectangular region that covers the tiles in the tile set, relative to the top-left pixel of the picture, in luma samples of the base region.
region_width specifies the width of the minimum rectangular region that covers the tiles in the tile set, in luma samples of the base region.
region_height specifies the height of the minimum rectangular region that covers the tiles in the tile set, in luma samples of the base region.</insert>

Thus, in the example text above, a tile set has a layer-specific scope. Furthermore, as part of generating the tile set group entry (e.g., TileSetGroupEntry), file generation device 34 may include, in the tile set group entry, dependency information (e.g., independent_idc) that describes dependency within a layer to which the tile set belongs. For example, file generation device 34 may include, in the tile set group entry, a particular syntax element (e.g., independent_idc) that specifies coding dependencies between the tile set and other tile sets in the current picture and in reference pictures of the layer to which the tile set belongs. In this example, file generation device 34 may indicate, in a layer information sample group (e.g., a 'linf' sample group) in the file or an operation point information sample group (e.g., a 'oinf' sample group) in the file, inter-layer dependencies. In some examples, the particular syntax element is a flag (e.g., independent_flag). In such examples, the flag has exactly two states, a first state of the flag indicating no temporal dependency, a second state of the flag indicating that there may or may not be temporal dependency. Similarly, in some examples, file parsing unit 31 may obtain, from within the tile set group entry, a particular syntax element that specifies coding dependencies between the tile set and other tile sets in the current picture and in reference pictures of the layer to which the tile set belongs. Additionally, in this example, file parsing unit 31 may determine, based on a layer information sample group in the file or an operation point information sample group in the file, inter-layer dependencies. In this example, file parsing unit 31 may process the tile set by processing the tile set based on the horizontal offset syntax element, the vertical offset syntax element, the width syntax element, the height syntax element, and the inter-layer dependencies.

When the region covered by the tiles in a tile set is not of a rectangular shape, the minimum rectangular area is described by horizontal_offset, vertical_offset, region_width and region_height, as shown in the example of FIG. 4. Furthermore, consistent with examples above indicating that tile sets that cover collocated regions in different layers have the same tile set ID and that layer dependency may be signaled in 'oinf' and 'linf' sample groups, the semantics of the independent_idc syntax element as set forth in the text above include:

Inter-layer dependencies, if any, are indicated by 'linf' and/or 'oinf' sample group. A tile set with groupID gidA and layerID lidA has inter-layer dependency to another tile set with groupID gidB and layerID lidB if gidA is equal to gidB and lidB is a reference layer of lidA as indicated by 'linf' and/or 'oinf' sample group.

In some examples, after the proposed modification above, only two values of the independent_idc syntax element have meaningful use; they are: the independent_idc syntax element having a value equal to either 1 or 2. In other words, the value of the independent_idc syntax element having a value equal to 0 does not have any meaningful use. Accordingly, the independent_idc syntax element can be simplified as a flag rather than an indicator. Thus, the independent_idc syntax element may consist of 1 bit, as opposed to two bits. The two states of the flag can be specified as "no temporal dependency" and "may or may not have temporal dependency." A file composer (e.g., file generation device 34) may always be able to use the latter as an option, thereby achieving what is achieved by the independent_idc syntax element having the value 0 as defined in the semantics above.

In another example, the syntax and semantics of the TileSetGroupEntry box after merging with the TileRegionGroupEntry box may be defined as follows:

```
class TileSetGroupEntry( ) extends VisualSampleGroupEntry
('tsif') {
    unsigned int(16) groupID;
    <insert>unsigned int(6) layerID;
    int (2) reserved;
    int(2) dependency_list;
    unsigned int(1) rectangular_flag;
    unsigned int(2) independent_idc;
    unsigned int(1) filtering_disabled;
    int (1) reserved;
    if (rectangular_flag == 1) {
        unsigned int(16) horizontal_offset;
        unsigned int(16) vertical_offset;
        unsigned int(16) region_width;
        unsigned int(16) region_height;
    }</insert>
    <delete>int(2) dependency_list;
    int (5) reserved;
    if ((dependency_list==1) || (dependency_list==3)) {
        unsigned int(16) dependency_tile_count;
        for (i=1; i<= dependency_tile_count; i++){
            unsigned int(16) dependencyTileGroupID;
        }
        if (dependency_list==3) {
            unsigned int(16) irap_dependency_tile_count;
            for (i=1; i<= irap_dependency_tile_count; i++){
                unsigned int(16) irap_dependencyTileGroupID;
            }
    } else if (dependency_list==2) {
        unsigned int(16) topLeftDependencyTileGroupId;
        unsigned int(16)
bottomRightDependencyTileGroupId;
    }</delete>
}
```

The two example modified syntaxes of the TileSetGroupEntry box shown above differ in that the second modified syntax of the TileSetGroupEntry box includes a "rectangular_flag" syntax element and includes the "horizontal_offset," "vertical_offset", "region_width", and "region_height" syntax elements only if the "rectangular_flag" syntax element is equal to 1. The "rectangular_flag" syntax element indicates whether the tile set corresponding to the TileSetGroupEntry box is rectangular. This is consistent with the example above regarding the information of horizontal offset, vertical offset, width and height being signaled only if the region covered by the tiles in the tile set is of rectangular shape.

As discussed above, particular examples of this disclosure add the mapping mechanism for tiles in sub-samples to a NALUMapEntry instead of a TileRegionGroupEntry. The following text provides additional example details in accordance with such examples.

```
class NALUMapEntry( ) extends VisualSampleGroupEntry
  ('nalm') {
    unsigned int(6) reserved = 0;
    unsigned int(1) large_size;
    <insert>unsigned int(1) nalu_flag;</insert>
    <delete>unsigned int(1) rle;</delete>
    if (large_size) {
      unsigned int(16) entry_count;
    } else {
      unsigned int(8) entry_count;
    }
    <delete>for (i=1; i<= entry_count; i++) {</delete>
    <insert>for (i=0; i < entry_count; i++) {</insert>
      <delete>if (rle) {
        if (large_size) {
          unsigned int(16) NALU_start_number;
        } else {
          unsigned int(8) NALU_start_number;
        }
      }</delete>
      <insert>for (j=0; j < subsample_count; j++) {</insert>
        unsigned int(16) groupID;
      <insert>}</insert>
    }
  }
``` large_size indicates whether the number of NAL units entries in the track samples is represented on 8 or 16 bits.

<insert>nalu_flag indicates whether each NAL unit is mapped to at most one tile set. When nalu_flag is equal to 1, the value of subsample_count is set to 1, otherwise, the value of subsample_count is set equal to the corresponding subsample_count value in the SubSampleInformationBox with flags equal to 2 (tile-based sub-samples).</insert>

<delete>rle indicates whether run-length encoding is used (1) to assign groupID to NAL units or not (0).</delete> entry_count specifies the number of entries in the map. <delete>Note that when rle is equal to 1, the entry_count corresponds to the number of runs where consecutives NAL units are associated with the same group. When rle is equal to 0, entry_count represents the total number of NAL units.

NALU_start_number is the 1-based NALU index in the sample of the first NALU in the current run associated with groupID.</delete> groupID indicates the corresponding <delete>scalable, multiview,</delete> tile set <delete>group</delete> entry, as indicated in the sample group descriptions. If 0, no group is associated to these identified NALUs.

Furthermore, as noted above, in some examples of this disclosure, the run length encoding mechanism in the NALUMapEntry box is removed. The removal of the run length encoding mechanism from the NALUMapEntry box corresponds to the following in the amended NALUMapEntry box shown above:

<delete>rle indicates whether run-length encoding is used (1) to assign groupID to NAL units or not (0).</delete>
entry_count specifies the number of entries in the map. <delete>Note that when rle is equal to 1, the entry_count corresponds to the number of runs where consecutives NAL units are associated with the same group. When rle is equal to 0, entry_count represents the total number of NAL units.

NALU_start_number is the 1-based NALU index in the sample of the first NALU in the current run associated with groupID.</delete>

<delete>for (i=1; i < entry_count; i++) {</delete>
  <delete>if (rle) {
    if (large_size) {
      unsigned int(16) NALU_start_number;
    } else {
      unsigned int(8) NALU_start_number;
    }
  }</delete>

The following syntax and semantics of NALUMapEntry shows an example of changes to ISO/IEC 14496-15 to implement various examples described elsewhere in this disclosure.

```
class NALUMapEntry( ) extends VisualSampleGroupEntry
  ('nalm') {
    unsigned int(6) reserved = 0;
    unsigned int(1) large_size;
    <insert>unsigned int(1) nalu_flag;</insert>
    <delete>unsigned int(1) rle;</delete>
    if (large_size) {
      unsigned int(16) entry_count;
    } else {
      unsigned int(8) entry_count;
    }
    <insert>if (nalu_flag = 1) {</insert>
      <delete>for (i=1; i < entry_count; i++) {</delete>
      <insert>for (i=0; i < entry_count; i++) {</insert>
        <delete>if (rle) {
          if (large_size) {
            unsigned int(16) NALU_start_number;
          } else {
            unsigned int(8) NALU_start_number;
          }
        }</delete>
        unsigned int(16) groupID;
      }
    <insert>}
    else {
      for (i=0; i < entry_count; i++) {
        unsigned int(16) subsample_count;
        for (j = 0; j < subsample_count; j++) {
          unsigned int(16) groupID;
          if (groupID > 1) {
            unsigned int(16) subsample_idx;
          }
        }
      }
    }</insert>
  }
``` large_size indicates whether the number of NAL units entries in the track samples is represented on 8 or 16 bits.

<insert>nalu_flag indicates whether each NAL unit is mapped to at most one tile region or tile set. When nalu_flag is equal to 1, each NAL unit is mapped to at most one tile region or tile set. When nalu_flag is equal to 0, each NAL unit may be mapped to more than one tile region or tile set.</insert>

<delete>rle indicates whether run-length encoding is used (1) to assign groupID to NAL units or not (0).</delete> entry_count specifies the number of entries in the map. <delete>Note that when rle is equal to 1, the entry_count corresponds to the number of runs where consecutives NAL units are associated with the same group. When rle is equal to 0, entry_count represents the total number of NAL units.

NALU_start_number is the 1-based NALU index in the sample of the first NALU in the current run associated with groupID.</delete>
<insert>subsample_count specifies the number of sub-samples present in the NAL unit.</insert>
groupID greater than 1 indicates the corresponding <delete>scalable, multiview,</delete> tile set group entry, as indicated in the sample group descriptions. If 0, <insert>the NAL unit or the sub-sample is not associated with any group</insert> <delete>no group is associated to these identified NALUs</delete><insert>;</insert> else if 1, the NAL unit is a non-VCL NAL unit and may be needed for processing any group with groupID greater than 1.
subsample_idx specifies the 0-based index to the sub-samples in the mapped sample, as indicated in the SubSampleInformationBox.</insert>

As noted above, in some examples of this disclosure, a loop may be added to the NALUMapEntry box to signal a groupID syntax element for each sub-sample in a NAL unit. This loop corresponds to the following in the amended NALUMapEntry box shown above:

```
for (j = 0; j < subsample_count; j++) {
    unsigned int(16) groupID;
    if (groupID > 1) {
        unsigned int(16) subsample_idx;
    }
}
```

Furthermore, as noted above, in some examples of this disclosure, a special groupID value indicates NAL units that are associated with all tile regions or tile sets. That is, when nalu_flag is equal is 1, the NALUMapEntry box may include a series of groupID syntax elements. Each respective groupID syntax element of the series of groupID syntax elements corresponds to a respective NAL unit and indicates a group identifier of the corresponding NAL unit. In the example text above, a groupID syntax element equal to 1 indicates the corresponding NAL unit is a non-VCL NAL unit and may be needed for processing any group with groupID greater than 1, and therefore is associated with all tile sets. The use of this special groupID may resolve a problem in ISO/IEC 14496-15 regarding how to assign groupID values to non-VCL NAL units. In the text above, the semantics of the groupID syntax element are amended to specify that NAL units assigned a groupID of 1 are non-VCL NAL units. In other examples, values other than 1 may be used to indicate non-VCL NAL units.

FIG. 8 is a conceptual diagram illustrating examples structure of a file 300, in accordance with one or more techniques of this disclosure. In the example of FIG. 8, file 300 includes a Movie box 302 and a plurality of Media Data boxes 304. Although illustrated in the example of FIG. 8 as being in the same file, in other examples Movie box 302 and Media Data boxes 304 may be in separate files. As indicated above, a box may be an object-oriented building block defined by a unique type identifier and length. For instance, a box may be the elementary syntax structure in ISOBMFF, including a four-character coded box type, a byte count of the box, and a payload.

Movie box 302 may contain metadata for tracks of file 300. Each track of file 300 may comprise a continuous stream of media data. Each of Media Data boxes 304 may include one or more samples 305. Each of samples 305 may comprise an audio or video access unit. As described elsewhere in this disclosure, each access unit may comprise multiple coded pictures in multi-view coding (e.g., MV-HEVC and 3D-HEVC) and scalable video coding (e.g., SHVC). For instance, an access unit may include one or more coded pictures for each layer.

Furthermore, in the example of FIG. 8, Movie box 302 includes a Track box 306. Track box 306 may enclose metadata for a track of file 300. In other examples, Movie box 302 may include multiple Track boxes for different tracks of file 300. Track box 306 includes a Media box 307. Media box 307 may contain all objects that declare information about the media data within the track. Media box 307 includes a Media Information box 308. Media Information box 308 may contain all objects that declare characteristic information of the media of the track. Media Information box 308 includes a Sample Table box 309. Sample Table box 309 may specify sample-specific metadata.

In the example of FIG. 8, Sample Table box 309 includes at least one SampleToGroup box 310, a SampleGroupDescription box 312, and a SampleGroupDescription box 314. In other examples, Sample Table box 309 may include other boxes in addition to SampleToGroup box 310, SampleGroupDescription box 312, and SampleGroupDescription box 314, and/or may include multiple SampleToGroup boxes and SampleGroupDescription boxes. SampleToGroup box 310 may map samples (e.g., particular ones of samples 305) to a group of samples. SampleGroupDescription box 312 and SampleGroupDescription box 314 may specify a property shared by the samples in the group of samples (i.e., sample group).

Furthermore, in the example of FIG. 8, SampleToGroup box 310 includes a grouping_type syntax element 319 (i.e., a grouping type syntax element), an entry_count syntax element 315 (i.e., an entry count syntax element), and one or more sample group entries 316. Entry_count syntax element 315 indicates the number of sample group entries 316. Each of sample group entries 316 includes a sample_count syntax element 317 (i.e., a sample count syntax element) and a group_description_index syntax element 318 (i.e., a group description index syntax element). Sample_count syntax element 317 may indicate a number of samples associated with the sample group entry containing sample_count syntax element 317. Group_description_index syntax element 318 may identify, within a SampleGroupDescription box (e.g., SampleGroupDescription box 312, SampleGroupDescription box 314), a group description entry that contains a description of the samples associated with the sample group entry containing group_description_index syntax element 318.

Figure 10:
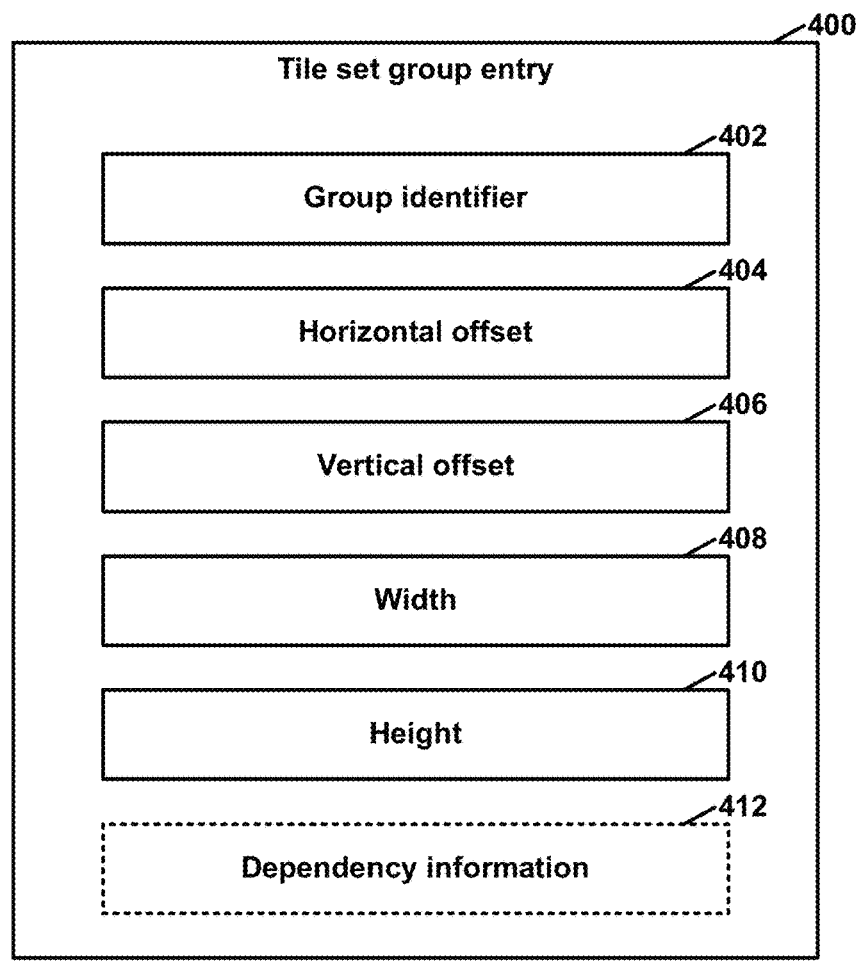
FIG. 10 is a conceptual diagram illustrating a tile set entry group, in accordance with one or more techniques of this disclosure.

Additionally, in the example of FIG. 8, SampleGroupDescription box 312 includes a grouping_type syntax element 320, an entry_count syntax element 322, and one or more tile set group entries 324. Each of tile set group entries 324 is an instance of a sample group entry. If a grouping type syntax element of a SampleToGroup box (e.g., grouping_type syntax element 319 of SampleToGroup box 310) specifies a value matching a value of grouping_type syntax element 320, the SampleToGroup box corresponds to the SampleGroupDescription box. Entry_count syntax element 322 indicates the number of tile set group entries 324 in the SampleGroupDescription box. FIG. 10, described in detail elsewhere in this disclosure, illustrates example content of a tile set group entry.

Furthermore, in the example of FIG. 8, SampleGroupDescription box 314 includes a grouping_type syntax element 326, an entry_count syntax element 328, and one or more NAL unit map entries 330. Each of NAL unit map entries 330 is an instance of a sample group entry. Entry_count syntax element 328 indicates the number of NAL unit map entries 330 in SampleGroupDescription box 314. In some examples, group identifier syntax element 402 has a value (e.g., 1) indicating a NAL unit is associated with all tile sets (e.g., all tiles sets of a layer).

FIG. 9 is a conceptual diagram illustrating an example structure of a file 350, in accordance with one or more techniques of this disclosure. In the examples of FIG. 9, file 350 includes one or more Movie Fragment boxes 352 and a plurality of media data boxes 354. Although illustrated in the example of FIG. 9 as being in the same file, in other examples Movie Fragment boxes 352 and Media Data boxes 354 may be in separate files. Each of Media Data boxes 354 may include one or more samples 356. Some or all of samples 356 may comprise a respective picture of the video contents. Each of the Movie Fragment boxes corresponds to a movie fragment. Each movie fragment may comprise a set of track fragments. There may be zero or more track fragments per track.

In the example of FIG. 9, a Movie Fragment box 352 provides information regarding a corresponding movie fragment. Movie Fragment box 352 may include a Track Fragment box 358. Track Fragment box 358 corresponds to a track fragment and provides information about the track fragment.

For instance, in the example of FIG. 9, Track Fragment box 358 may include a SampleToGroup box 362, a SampleGroupDescription box 364, and a SampleGroupDescription box 366. SampleToGroup box 362 and SampleGroupDescription boxes 364, 366, contain information about the track fragment corresponding to Track Fragment box 358. Track Fragment box 358 may include one or more SampleToGroup boxes and one or more SampleGroupDescription boxes in addition to SampleToGroup box 362 and SampleGroupDescription boxes 364, 366. Furthermore, in the example of FIG. 9, SampleToGroup box 362 includes a grouping_type syntax element 370 (i.e., a grouping type syntax element), an entry_count syntax element 371 (i.e., an entry count syntax element), and one or more sample group entries 372. Entry_count syntax element 371 indicates the number of sample group entries 372. Each of sample group entries 372 includes a sample_count syntax element 373 (i.e., a sample count syntax element) and a group_description_index syntax element 374 (i.e., a group description index syntax element). Sample_count syntax element 373 may indicate a number of samples associated with the sample group entry containing sample_count syntax element 373. Group_description_index syntax element 374 may identify, within a SampleGroupDescription box (e.g., SampleGroupDescription box 364), a group description entry that contains a description of the samples associated with the sample group entry containing group_description_index syntax element 374.

Additionally, in the example of FIG. 9, SampleGroupDescription box 364 includes a grouping_type syntax element 380, an entry_count syntax element 382, and one or more tile set group entries 384. Each of tile set group entries is an instance of a group description entry. Entry_count syntax element 382 indicates the number of tile set group entries 384 in SampleGroupDescription box 364.

Furthermore, in the example of FIG. 9, SampleGroupDescription box 366 includes a grouping_type syntax element 386, an entry_count syntax element 388, and one or more NAL unit map entries 390. Each of NAL unit map entries 390 is an instance of a sample group entry. Entry_count syntax element 388 indicates the number of NAL unit map entries 390 in SampleGroupDescription box 366.

In either FIG. 8 or FIG. 9, the TileRegionGroupEntry extends VisualSampleGroupEntry. As described in section 8.9.3.2 of 14496-12, VisualSampleGroupEntry is an extension of the SampleGroupDescriptionEntry class. Thus, in some examples, instances of the TileSetGroupEntry class (i.e., TileSetGroupEntry boxes), may be different ones of group description entries.

FIG. 10 is a conceptual diagram illustrating a tile set entry group 400, in accordance with one or more techniques of this disclosure. As illustrated in the example of FIG. 10, tile set group entry 400 may include a group identifier (e.g., groupID) syntax element 402, a horizontal offset (e.g., horizontal_offset) syntax element 404, a vertical offset (e.g., vertical_offset) syntax element 406, a width (e.g., region_width) syntax element 408, and a height (e.g., region_height) syntax element 410. Group identifier syntax element 402 identifies a tile set.

Horizontal offset syntax element 404 specifies a horizontal offset of a top-left pixel of a minimum rectangular region that covers tiles in the tile set. Vertical offset syntax element 406 specifies a vertical offset of the top-left pixel of the minimum rectangular region that covers tiles in the tile set. Width syntax element 408 specifies a width of the minimum rectangular region that covers the tiles in the tile set. Height syntax element 410 specifies a height of the minimum rectangular region that covers the tiles in the tile set.

In some examples, tile set group entry 400 may also include dependency information 412. Dependency information 412 may describe dependency within a layer to which the tile set belongs. For instance, dependency information 412 may describe a temporal identifier that identifies a temporal sub-layer of samples to which tile set group entry 400 applies. In some examples, dependency information 412 comprises a particular syntax element (e.g., independent_idc, independent_flag) that specifies coding dependencies between the tile set and other tile sets in the current picture and in reference pictures of the layer to which the tile set belongs.

Figure 11:
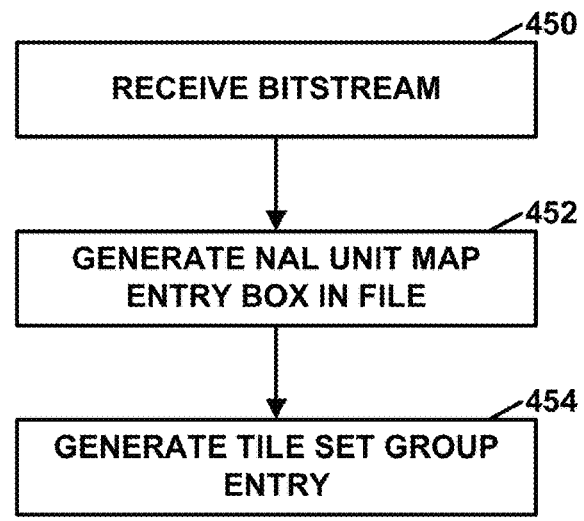
FIG. 11 is a flowchart illustrating an example of a process for generating a file for storage of video data, in accordance with a technique of this disclosure.

FIG. 11 is a flowchart illustrating an example of a process for generating a file for storage of video data, in accordance with a technique of this disclosure. The flowcharts of this disclosure are provided as examples. Other processes may include more, fewer, or different actions. Moreover, in some instances, the actions may be performed in different orders or in parallel. Furthermore, this disclosure describes FIG. 11 with reference to file generation device 34. However, other devices may be capable of performing the process of FIG. 11.

In the example of FIG. 11, file generation device 34 may receive a bitstream that includes a sequence of bits that forms a representation of encoded pictures of the video data (450). For example, a memory of file generation device 34 may receive the bitstream from a network interface, disc, or other media. The pictures of the video data include a current picture. The current picture is partitioned into a plurality of tiles. Each respective tile of the plurality of tiles is a respective rectangular region. For instance, the current picture may be partitioned into four equally sized tiles, each being a rectangular region, as shown in the examples of FIG. 2 and FIG. 3.

Additionally, in the example of FIG. 11, file generation device 34 generates a NAL Unit Map Entry box (e.g., NALUMapEntry) in a file (452). For instance, file generation device 34 may store data representing the NAL unit Map Entry box in the file. The NAL Unit Map Entry box associates NAL units of the bitstream with a tile set. The tile set includes one or more tiles of the plurality of tiles into which the current picture is partitioned. For instance, as shown in the example of FIG. 4, the tile set may include two or more tiles of the plurality of tiles into which the current picture is partitioned. In some instances, a region of the current picture covered by the tiles in the tile set (e.g., area 124 of FIG. 4) is not rectangular in shape. In some instances, the region of the current picture covered by the tiles in the tile set is rectangular in shape.

Furthermore, in the example of FIG. 11, file generation device 34 generates a tile set group entry (e.g., a TileSetGroupEntry, TileRegionGroupEntry) in the file (454). For instance, file generation device 34 may store data representing the tile set group entry in the file. The tile set group entry may include a group identifier syntax element that identifies the tile set. Additionally, the tile set entry box includes a horizontal offset syntax element (e.g., horizontal_offset), a vertical offset syntax element (e.g., vertical_offset), a width syntax element (e.g., region_width), and a height syntax element (e.g., region_height). The horizontal offset syntax element specifies a horizontal offset of a top-left pixel of a minimum rectangular region that covers tiles in the tile set. The vertical offset syntax element specifies a vertical offset of the top-left pixel of the minimum rectangular region that covers tiles in the tile set. The width syntax element specifies a width of the minimum rectangular region that covers the tiles in the tile set. The height syntax element specifies a height of the minimum rectangular region that covers the tiles in the tile set.

Furthermore, in one example, file generation device 34 may generate a second NAL Unit Map Entry box in the file. In this example, the second NAL Unit Map Entry box may include a group identifier syntax element. Furthermore, in this example, the group identifier syntax element of the second NAL Unit Map Entry box has a value (e.g., 1 or another value) indicating a NAL unit is associated with all tile sets. As described elsewhere in this disclosure, a file processing device (e.g., a device implementing file parsing unit 31 (FIG. 1)) may use the second NAL Unit Map Entry to identify non-VCL NAL units that may include data needed to decode VCL NAL units that include the tile set.

Figure 12:
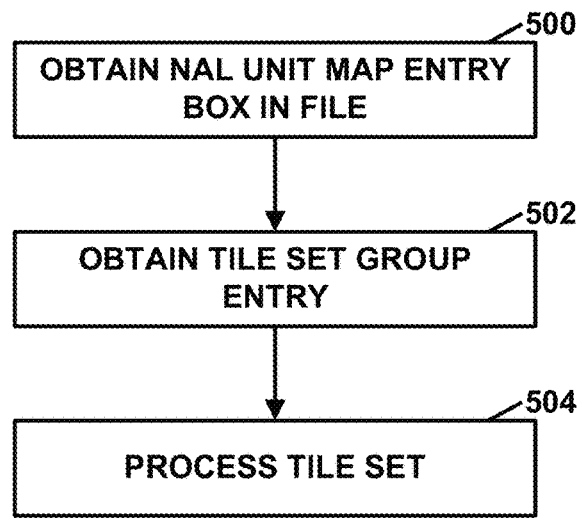
FIG. 12 is a flowchart illustrating an example of a process for processing a file storing encoded video data, in accordance with a technique of this disclosure.

FIG. 12 is a flowchart illustrating an example of a process for processing a file storing encoded video data, in accordance with a technique of this disclosure. The example process of FIG. 12 is explained with reference to file parsing unit 31. However, other devices or units may perform the example process of FIG. 12.

In the example of FIG. 12, file parsing unit 31 obtains a NAL Unit Map Entry box (e.g., NALUMapEntry) in a file (500). For instance, file parsing unit 31 may read the NAL Unit Map Entry box from the file. The NAL Unit Map Entry box associates NAL units of a bitstream with a tile set. For instance, as described elsewhere in this disclosure, the NAL Unit Map Entry box may include syntax elements (e.g., groupID) syntax elements that indicate tile sets with which NAL units are mapped. The bitstream includes a sequence of bits that forms a representation of encoded pictures of the video data. The pictures of the video data include a current picture. The current picture is partitioned into a plurality of tiles. For instance, syntax elements (e.g., num_tile_columns_minus1, num_tile_rows_minus1, uniform_spacing_flag, etc., in HEVC) may specify how the current picture is partitioned into tiles. Each respective tile of the plurality of tiles is a respective rectangular region. The tile set includes one or more tiles of the plurality of tiles into which the current picture is partitioned. For instance, as shown in the example of FIG. 4, the tile set may include two or more tiles of the plurality of tiles into which the current picture is partitioned. In some instances, a region of the current picture covered by the tiles (e.g., area 124 of FIG. 4) in the tile set is not rectangular in shape. In some instances, the region of the current picture covered by the tiles in the tile set is rectangular in shape.

Furthermore, in the example of FIG. 12, file parsing unit 31 obtains a tile set group entry (e.g., a TileSetGroupEntry, a TileRegionGroupEntry) in the file (502). The tile set group entry includes a group identifier syntax element that identifies the tile set. The tile set entry box includes a horizontal offset syntax element (e.g., horizontal_offset), a vertical offset syntax element (e.g., vertical_offset), a width syntax element (e.g., region_width), and a height syntax element (e.g., region_height). The horizontal offset syntax element specifies a horizontal offset of a top-left pixel of a minimum rectangular region that covers tiles in the tile set. The vertical offset syntax element specifies a vertical offset of the top-left pixel of the minimum rectangular region that covers tiles in the tile set. The width syntax element specifies a width of the minimum rectangular region that covers the tiles in the tile set. The height syntax element specifies a height of the minimum rectangular region that covers the tiles in the tile set.

Additionally, in the example of FIG. 12, file parsing unit 31 processes the tile set based on the horizontal offset syntax element, the vertical offset syntax element, the width syntax element, and the height syntax element (504). File parsing unit 31 may process the tile set in various ways. For example, file parsing unit 31 may extract the tiles of the tile set from the file and transmitting the extracted tiles. For instance, file parsing unit 31 may determine (e.g., based on the location and size of the tile set) whether the tile set corresponds to a desired region to be displayed. If so, file parsing unit 31 may use the NAL unit map entry box to determine NAL units that include encoded blocks of the tile set. File parsing unit 31 may then extract the determined NAL units.

Furthermore, in one example, file parsing unit 31 may obtain, from the file, a second NAL Unit Map Entry box. The second NAL Unit Map Entry box may include a group identifier syntax element. Furthermore, in this example, the group identifier syntax element (e.g., groupID) of the second NAL Unit Map Entry box having a particular value (e.g., 1 or another value) indicates a NAL unit is associated with all tile sets. In this example, based on the group identifier syntax element of the second NAL Unit Map Entry box having the value indicating the NAL unit is associated with all tile sets, file parsing unit 31 may extract the NAL unit from the file. Furthermore, in some instances, file parsing unit 31 may transmit the NAL unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for storage of video data, the method comprising:
   receiving, by a file generation device, a bitstream that includes a sequence of bits that forms a representation of encoded pictures of the video data, the pictures of the video data including a current picture, the current picture being partitioned into a plurality of tiles, each respective tile of the plurality of tiles being a respective rectangular region;
   generating, by the file generation device, a Network Abstraction Layer (NAL) Unit Map Entry box in a file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and
   generating, by the file generation device, a tile set group entry in the file,
      the tile set group entry including a group identifier syntax element that identifies the tile set,
      the tile set group entry including a horizontal offset syntax element, a vertical offset syntax element, a width syntax element, and a height syntax element,
      the horizontal offset syntax element specifying a horizontal offset of a top-left pixel of a minimum rectangular region that covers the tiles in the tile set,
      the vertical offset syntax element specifying a vertical offset of the top-left pixel of the minimum rectangular region that covers the tiles in the tile set,
      the width syntax element specifying a width of the minimum rectangular region that covers the tiles in the tile set, and
      the height syntax element specifying a height of the minimum rectangular region that covers the tiles in the tile set.

2. The method of claim 1, wherein the tile set has a layer-specific scope.

3. The method of claim 2, wherein generating the tile set group entry comprises:
   including, in the tile set group entry, dependency information that describes dependency within a layer to which the tile set belongs.

4. The method of claim 3, wherein:
   including the dependency information in the tile set group entry comprises including, in the tile set group entry, a particular syntax element that specifies coding dependencies between the tile set and other tile sets in the current picture and in reference pictures of the layer to which the tile set belongs, and
   the method further comprises indicating, in a layer information sample group in the file or an operation point information sample group in the file, inter-layer dependencies.

5. The method of claim 4, wherein the particular syntax element is a flag, wherein the flag has exactly two states, a first state of the flag indicating no temporal dependency, and a second state of the flag indicating that there may or may not be temporal dependency.

6. The method of claim 1, wherein the NAL Unit Map Entry box is a first NAL Unit Map Entry box, the method further comprising:
   generating a second NAL Unit Map Entry box in the file, the second NAL Unit Map Entry box including a group identifier syntax element, the group identifier syntax element of the second NAL Unit Map Entry box having a value indicating a NAL unit is associated with all tile sets.

7. A method of processing a file storing encoded video data, the method comprising:
   obtaining, by a file processing device, a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape;

obtaining, by the file processing device, a tile set group entry in the file,
the tile set group entry including a group identifier syntax element that identifies the tile set,
the tile set group entry including a horizontal offset syntax element, a vertical offset syntax element, a width syntax element, and a height syntax element,
the horizontal offset syntax element specifying a horizontal offset of a top-left pixel of a minimum rectangular region that covers the tiles in the tile set,
the vertical offset syntax element specifying a vertical offset of the top-left pixel of the minimum rectangular region that covers the tiles in the tile set,
the width syntax element specifying a width of the minimum rectangular region that covers the tiles in the tile set, and
the height syntax element specifying a height of the minimum rectangular region that covers the tiles in the tile set; and processing the tile set based on the horizontal offset syntax element, the vertical offset syntax element, the width syntax element, and the height syntax element.

8. The method of claim 7, wherein processing the tile set comprises:
extracting the tiles of the tile set from the file; and
transmitting the extracted tiles.

9. The method of claim 7, wherein the tile set has a layer-specific scope.

10. The method of claim 9, wherein:
obtaining the tile set group entry comprises obtaining, from within the tile set group entry, dependency information that describes dependency within a layer to which the tile set belongs, and
processing the tile set comprises processing the tile set based on the horizontal offset syntax element, the vertical offset syntax element, the width syntax element, the height syntax element, and the dependency information.

11. The method of claim 10, wherein:
obtaining the dependency information in the tile set group entry comprises obtaining, from within the tile set group entry, a particular syntax element that specifies coding dependencies between the tile set and other tile sets in the current picture and in reference pictures of the layer to which the tile set belongs,
the method further comprises determining, based on a layer information sample group in the file or an operation point information sample group in the file, inter-layer dependencies, and
processing the tile set comprises processing the tile set based on the horizontal offset syntax element, the vertical offset syntax element, the width syntax element, the height syntax element, and the inter-layer dependencies.

12. The method of claim 11, wherein the particular syntax element is a flag, wherein the flag has exactly two states, a first state of the flag indicating no temporal dependency, and a second state of the flag indicating that there may or may not be temporal dependency.

13. The method of claim 7, wherein the NAL Unit Map Entry box is a first NAL Unit Map Entry box, the method further comprising:
obtaining, from the file, a second NAL Unit Map Entry box, the second NAL Unit Map Entry box including a group identifier syntax element, the group identifier syntax element of the second NAL Unit Map Entry box having a value indicating a NAL unit is associated with all tile sets; and
based on the group identifier syntax element of the second NAL Unit Map Entry box having the value indicating the NAL unit is associated with all tile sets:
extracting the NAL unit from the file; and
transmitting the NAL unit.

14. A device for generating a file for storing video data, the device comprising:
a memory configured to store a file for storage of video contents; and
one or more processors implemented in circuitry, the one or more processors configured to:
receive a bitstream that includes a sequence of bits that forms a representation of encoded pictures of the video data, the pictures of the video data including a current picture, the current picture being partitioned into a plurality of tiles, each respective tile of the plurality of tiles being a respective rectangular region;
generate a Network Abstraction Layer (NAL) Unit Map Entry box in the file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and
generate a tile set group entry in the file,
the tile set group entry including a group identifier syntax element that identifies the tile set,
the tile set group entry including a horizontal offset syntax element, a vertical offset syntax element, a width syntax element, and a height syntax element,
the horizontal offset syntax element specifying a horizontal offset of a top-left pixel of a minimum rectangular region that covers the tiles in the tile set,
the vertical offset syntax element specifying a vertical offset of the top-left pixel of the minimum rectangular region that covers the tiles in the tile set,
the width syntax element specifying a width of the minimum rectangular region that covers the tiles in the tile set, and
the height syntax element specifying a height of the minimum rectangular region that covers the tiles in the tile set.

15. The device of claim 14, wherein the tile set has a layer-specific scope.

16. The device of claim 15, wherein the one or more processors are configured such that, as part of generating the tile set group entry, the one or more processors:
include, in the tile set group entry, dependency information that describes dependency within a layer to which the tile set belongs.

17. The device of claim 16, wherein:
the one or more processors are configured such that, as part of including the dependency information in the tile set group entry, the one or more processors include, in the tile set group entry, a particular syntax element that specifies coding dependencies between the tile set and other tile sets in the current picture and in reference pictures of the layer to which the tile set belongs, and the one or more processors are further configured to indicate, in a layer information sample group in the file or an operation point information sample group in the file, inter-layer dependencies.

18. The device of claim 17, wherein the particular syntax element is a flag, wherein the flag has exactly two states, a first state of the flag indicating no temporal dependency, a second state of the flag indicating that there may or may not be temporal dependency.

19. The device of claim 14, wherein the NAL Unit Map Entry box is a first NAL Unit Map Entry box, the one or more processors further configured to:
generate a second NAL Unit Map Entry box in the file, the second NAL Unit Map Entry box including a group identifier syntax element, the group identifier syntax element of the second NAL Unit Map Entry box having a value indicating a NAL unit is associated with all tile sets.

20. A device for processing a file storing encoded video data, the device comprising:
a memory configured to store a file for storage of video contents; and
one or more processors implemented in circuitry, the one or more processors configured to:
obtain a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape;
obtain a tile set group entry in the file,
the tile set group entry including a group identifier syntax element that identifies the tile set,
the tile set group entry including a horizontal offset syntax element, a vertical offset syntax element, a width syntax element, and a height syntax element,
the horizontal offset syntax element specifying a horizontal offset of a top-left pixel of a minimum rectangular region that covers the tiles in the tile set,
the vertical offset syntax element specifying a vertical offset of the top-left pixel of the minimum rectangular region that covers the tiles in the tile set,
the width syntax element specifying a width of the minimum rectangular region that covers the tiles in the tile set, and
the height syntax element specifying a height of the minimum rectangular region that covers the tiles in the tile set; and
process the tile set based on the horizontal offset syntax element, the vertical offset syntax element, the width syntax element, and the height syntax element.

21. The device of claim 20, wherein the one or more processors are configured such that, as part of processing the tile set, the one or more processors:
extract the tiles of the tile set from the file; and
transmit the extracted tiles.

22. The device of claim 21, wherein the tile set has a layer-specific scope.

23. The device of claim 22, wherein:
the one or more processors are configured such that, as part of obtaining the tile set group entry, the one or more processors obtain, from within the tile set group entry, dependency information that describes dependency within a layer to which the tile set belongs, and
the one or more processors are configured such that, as part of processing the tile set, the one or more processors process the tile set based on the horizontal offset syntax element, the vertical offset syntax element, the width syntax element, the height syntax element, and the dependency information.

24. The device of claim 23, wherein:
the one or more processors are configured such that, as part of obtaining the dependency information in the tile set group entry, the one or more processors obtain, from within the tile set group entry, a particular syntax element that specifies coding dependencies between the tile set and other tile sets in the current picture and in reference pictures of the layer to which the tile set belongs,
the one or more processors are further configured to determine, based on a layer information sample group in the file or an operation point information sample group in the file, inter-layer dependencies, and
the one or more processors are configured such that, as part of processing the tile set, the one or more processors process the tile set based on the horizontal offset syntax element, the vertical offset syntax element, the width syntax element, the height syntax element, and the inter-layer dependencies.

25. The device of claim 24, wherein the particular syntax element is a flag, wherein the flag has exactly two states, a first state of the flag indicating no temporal dependency, a second state of the flag indicating that there may or may not be temporal dependency.

26. The device of claim 20, wherein the tile set group entry is a first tile set group entry, the one or more processors further configured to:
obtain, from the file, a second NAL Unit Map Entry box, the second NAL Unit Map Entry box including a group identifier syntax element, the group identifier syntax element of the second NAL Unit Map Entry box having a value indicating a NAL unit is associated with all tile sets; and
based on the group identifier syntax element of the second NAL Unit Map Entry box having the value indicating the NAL unit is associated with all tile sets:
extract the NAL unit from the file; and
transmit the NAL unit.

27. A device for generating a file for storage video data, the device comprising:
means for receiving a bitstream that includes a sequence of bits that forms a representation of encoded pictures of the video data, the pictures of the video data including a current picture, the current picture being partitioned into a plurality of tiles, each respective tile of the plurality of tiles being a respective rectangular region;
means for generating a Network Abstraction Layer (NAL) Unit Map Entry box in a file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and means for generating a tile set group entry in the file,
the tile set group entry including a group identifier syntax element that identifies the tile set,
the tile set group entry including a horizontal offset syntax element, a vertical offset syntax element, a width syntax element, and a height syntax element,
the horizontal offset syntax element specifying a horizontal offset of a top-left pixel of a minimum rectangular region that covers the tiles in the tile set,
the vertical offset syntax element specifying a vertical offset of the top-left pixel of the minimum rectangular region that covers the tiles in the tile set,
the width syntax element specifying a width of the minimum rectangular region that covers the tiles in the tile set, and
the height syntax element specifying a height of the minimum rectangular region that covers the tiles in the tile set.

28. A device for processing a file storing encoded video data, the device comprising:
means for obtaining a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape;
means for obtaining a tile set group entry in the file,
the tile set group entry including a group identifier syntax element that identifies the tile set,
the tile set group entry including a horizontal offset syntax element, a vertical offset syntax element, a width syntax element, and a height syntax element,
the horizontal offset syntax element specifying a horizontal offset of a top-left pixel of a minimum rectangular region that covers the tiles in the tile set,
the vertical offset syntax element specifying a vertical offset of the top-left pixel of the minimum rectangular region that covers the tiles in the tile set,
the width syntax element specifying a width of the minimum rectangular region that covers the tiles in the tile set, and
the height syntax element specifying a height of the minimum rectangular region that covers the tiles in the tile set; and
means for processing the tile set based on the horizontal offset syntax element, the vertical offset syntax element, the width syntax element, and the height syntax element.

29. A non-transitory computer-readable data storage medium having instructions stored thereon that, when executed, configure a device to:
receive a bitstream that includes a sequence of bits that forms a representation of encoded pictures of the video data, the pictures of the video data including a current picture, the current picture being partitioned into a plurality of tiles, each respective tile of the plurality of tiles being a respective rectangular region;
generate a Network Abstraction Layer (NAL) Unit Map Entry box in a file, the NAL Unit Map Entry box associating NAL units of the bitstream with a tile set, the tile set including two or more tiles of the plurality of tiles into which the current picture is partitioned, a region of the current picture covered by the tiles in the tile set is not rectangular in shape; and
generate a tile set group entry in the file,
the tile set group entry including a group identifier syntax element that identifies the tile set,
the tile set group entry including a horizontal offset syntax element, a vertical offset syntax element, a width syntax element, and a height syntax element,
the horizontal offset syntax element specifying a horizontal offset of a top-left pixel of a minimum rectangular region that covers the tiles in the tile set,
the vertical offset syntax element specifying a vertical offset of the top-left pixel of the minimum rectangular region that covers the tiles in the tile set,
the width syntax element specifying a width of the minimum rectangular region that covers the tiles in the tile set, and
the height syntax element specifying a height of the minimum rectangular region that covers the tiles in the tile set.

30. A non-transitory computer-readable data storage medium having instructions stored thereon that, when executed, configure a device to:
obtain, by a file processing device, a Network Abstraction Layer (NAL) Unit Map Entry box in a file, the NAL Unit Map Entry box associating NAL units of a bitstream with a tile set, the bitstream including a sequence of bits that forms a representation of encoded pictures of the video data, the pictures of the video data including a current picture, the current picture being partitioned into a plurality of tiles, each respective tile of the plurality of tiles being a respective rectangular region, the tile set including two or more tiles of the plurality of tiles into which the current picture is partitioned, a region of the current picture covered by the tiles in the tile set being not rectangular in shape;
obtain, by the file processing device, a tile set group entry in the file,
the tile set group entry including a group identifier syntax element that identifies the tile set,
the tile set group entry including a horizontal offset syntax element, a vertical offset syntax element, a width syntax element, and a height syntax element,
the horizontal offset syntax element specifying a horizontal offset of a top-left pixel of a minimum rectangular region that covers the tiles in the tile set,
the vertical offset syntax element specifying a vertical offset of the top-left pixel of the minimum rectangular region that covers the tiles in the tile set,
the width syntax element specifying a width of the minimum rectangular region that covers the tiles in the tile set, and
the height syntax element specifying a height of the minimum rectangular region that covers the tiles in the tile set; and
process the tile set based on the horizontal offset syntax element, the vertical offset syntax element, the width syntax element, and the height syntax element.

* * * * *